US011957181B2

(12) United States Patent
Stura et al.

(10) Patent No.: US 11,957,181 B2
(45) Date of Patent: Apr. 16, 2024

(54) AEROSOL-GENERATING DEVICE HAVING OUTER AND INNER LIGHTING ARRAYS

(71) Applicant: Philip Morris Products S.A., Neuchâtel (CH)

(72) Inventors: Enrico Stura, Palézieux-Village (CH); Torsten Richard Mathias Tingström, Morges (CH); Ezequiel Valdez Rojas, Pully (CH); Valerio Oliana, Pully (CH)

(73) Assignee: Philip Morris Products S.A., Neuchâtel (CH)

( * ) Notice: Subject to any disclaimer, the term of this patent is extended or adjusted under 35 U.S.C. 154(b) by 0 days.

(21) Appl. No.: 18/041,564

(22) PCT Filed: Jun. 27, 2022

(86) PCT No.: PCT/EP2022/067607

§ 371 (c)(1),
(2) Date: Feb. 14, 2023

(87) PCT Pub. No.: WO2023/274977

PCT Pub. Date: Jan. 5, 2023

(65) Prior Publication Data

US 2023/0301369 A1 Sep. 28, 2023

(30) Foreign Application Priority Data

Jun. 30, 2021 (EP) .................................... 21182962

(51) Int. Cl.
*A24F 13/00* (2006.01)
*A24F 40/20* (2020.01)
(Continued)

(52) U.S. Cl.
CPC .............. *A24F 40/60* (2020.01); *A24F 40/20* (2020.01); *A24F 40/50* (2020.01); *F21V 33/0004* (2013.01)

(58) Field of Classification Search
CPC ..................................................... A24F 147/00
(Continued)

(56) References Cited

U.S. PATENT DOCUMENTS 11,666,098 B2 * 6/2023 Henry, Jr. ............... A24F 40/53 128/202.21
2014/0083442 A1 3/2014 Scatterday
(Continued)

FOREIGN PATENT DOCUMENTS

EP 3 791 740 A1 3/2021
RU 2 700 021 C2 9/2019
(Continued)

OTHER PUBLICATIONS

International Search Report dated Sep. 7, 2022 in PCT/EP2022/067607 filed on Jun. 27, 2022 (citing references 1-4 & 15-17 therein, 5 pages).

(Continued)

*Primary Examiner* — Phuong K Dinh
(74) *Attorney, Agent, or Firm* — Oblon, McClelland, Maier & Neustadt, L.L.P.

(57) ABSTRACT

An aerosol-generating device is provided for heating an aerosol-forming substrate to generate an inhalable aerosol during a usage session, the aerosol-generating device including: control electronics; and an outer lighting array partially or wholly surrounding an inner lighting array, the control electronics being coupled to the outer and inner lighting arrays and are configured to: i) selectively activate one of the outer and inner lighting arrays to generate a first predetermined light emission conveying first data indicative of a state of the aerosol-generating device, and ii) selectively activate the other of the outer and inner lighting arrays to generate a second predetermined light emission conveying second data indicative of a state of the aerosol-generating
(Continued)

device, in which the first data and the second data are different from one another.

17 Claims, 9 Drawing Sheets

(51) Int. Cl.
*A24F 40/50* (2020.01)
*A24F 40/60* (2020.01)
*F21V 33/00* (2006.01)

(58) Field of Classification Search
USPC .................................................. 131/328–329
See application file for complete search history.

(56) References Cited

U.S. PATENT DOCUMENTS

| | | | | |
|---|---|---|---|---|
| 2016/0089508 | A1* | 3/2016 | Smith | A61M 15/0085 128/202.21 |
| 2017/0020188 | A1 | 1/2017 | Cameron | |
| 2017/0093960 | A1* | 3/2017 | Cameron | H04W 4/80 |
| 2017/0259170 | A1 | 9/2017 | Bowen et al. | |
| 2019/0289915 | A1* | 9/2019 | Heidl | G06F 3/016 |
| 2019/0373950 | A1 | 12/2019 | Bowen et al. | |
| 2020/0000143 | A1* | 1/2020 | Anderson | G06F 18/22 |
| 2020/0397055 | A1 | 12/2020 | Bowen et al. | |
| 2022/0249941 | A1 | 8/2022 | Bowen et al. | |

FOREIGN PATENT DOCUMENTS

| | | |
|---|---|---|
| WO | WO 2021/032668 A1 | 2/2021 |
| WO | WO 2021/037403 A1 | 3/2021 |
| WO | WO 2021/043694 A1 | 3/2021 |
| WO | WO 2022/003068 A1 | 1/2022 |
| WO | WO 2022/003072 A1 | 1/2022 |

OTHER PUBLICATIONS

Written Opinion dated Sep. 7, 2022 in PCT/EP2022/067607 filed on Jun. 27, 2022 (citing references 1 & 15-17 therein, 7 pages).

Combined Russian Office Action and Search Report dated Jul. 20, 2023 in Russian Patent Application No. 2023103888/03 (with English Translation), citing references 1-2 and 15 therein, 13 pages.

* cited by examiner

AEROSOL-GENERATING DEVICE HAVING OUTER AND INNER LIGHTING ARRAYS

CROSS-REFERENCE TO RELATED APPLICATIONS

This application is a U.S. national stage application of PCT/EP2022/067607, filed on Jun. 27, 2022, which is based upon and claims the benefit of priority under 35 U.S.C. § 119 to European patent application no. 21182962.7, filed Jun. 30, 2021, the entire contents of each of which are incorporated herein by reference.

TECHNICAL FIELD

The present disclosure relates to an aerosol-generating device in which data concerning the progression of an operational phase of the device is visually conveyed to a user of the device.

DESCRIPTION OF THE RELATED ART

Aerosol-generating devices configured to generate an aerosol from an aerosol-forming substrate, such as a tobacco containing substrate, are known in the art. Typically, an inhalable aerosol is generated by the transfer of heat from a heat source to a physically separate aerosol-forming substrate or material, which may be located within, around or downstream of the heat source. An aerosol-forming substrate may be a liquid substrate contained in a reservoir. An aerosol-forming substrate may be a solid substrate. An aerosol-forming substrate may be a component part of a separate aerosol-generating article configured to engage with an aerosol-generating device to form an aerosol. During consumption, volatile compounds are released from the aerosol-forming substrate by heat transfer from the heat source and entrained in air drawn through the aerosol-generating article. As the released compounds cool, they condense to form an aerosol that is inhaled by the consumer.

During use of the aerosol-generating device, changes in one or more parameters of the device may occur. It is desired to provide an aerosol-generating device which is able to efficiently convey data concerning the state of the device to a user.

SUMMARY

According to an aspect of the present invention, there is provided an aerosol-generating device for heating an aerosol-forming substrate to generate an inhalable aerosol during a usage session. The aerosol-generating device comprises control electronics; and an outer lighting array partially or wholly surrounding an inner lighting army. The control electronics are coupled to the outer and inner lighting arrays. The control electronics are configured to: i) selectively activate one of the outer and inner lighting arrays to generate a first predetermined light emission conveying first data indicative of a state of the aerosol-generating device; and ii) selectively activate the other of the outer and inner lighting arrays to generate a second predetermined light emission conveying second data indicative of a state of the aerosol-generating device. The first data and the second data are different from one another.

BRIEF DESCRIPTION OF THE DRAWINGS

Examples will now be further described with reference to the figures, in which.

DETAILED DESCRIPTION

Figure 1:
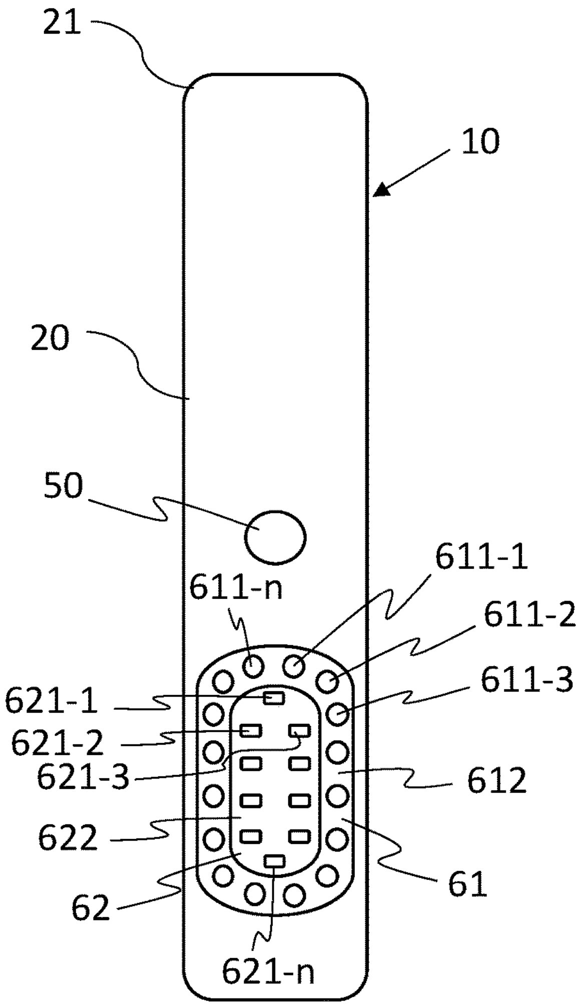
FIG. 1 illustrates a schematic side view of an aerosol-generating device.

As used herein, the term "aerosol-generating device" is used to describe a device that interacts with an aerosol-forming substrate of an aerosol-generating article to generate an aerosol. Preferably, the aerosol-generating device is a smoking device that interacts with an aerosol-forming substrate of an aerosol-generating article to generate an aerosol that is directly inhalable into a user's lungs thorough the user's mouth. The aerosol-generating device may be a holder for a smoking article. Preferably, the aerosol-generating article is a smoking article that generates an aerosol that is directly inhalable into a user's lungs through the user's mouth. More preferably, the aerosol-generating article is a smoking article that generates a nicotine-containing aerosol that is directly inhalable into a user's lungs through the user's mouth.

As used herein, the term "aerosol-forming substrate" denotes a substrate consisting of or comprising an aerosol-forming material that is capable of releasing volatile compounds upon heating to generate an aerosol.

As used herein, the term "light" refers to emissions of electromagnetic radiation which are in the visible range of the electromagnetic spectrum. The visible range of the electromagnetic spectrum is generally understood to encompass wavelengths in a range of about 380 nanometres to about 750 nanometres.

As used herein, the term "predetermined light emission" is an emission of light characterised in terms of one or more parameters of the light emission. By way of example, the one or more parameters may include any of: a luminance level of the light emission, a spatial variation in luminance level of the light emission over one or both of the outer and inner lighting arrays, a colour of the light emission, a spatial variation in colour of the light emission over one or both of the outer and inner lighting arrays, a proportion of one or both of the outer and inner lighting arrays which is activated to generate the light emission. The one or more parameters may also include a variation with time of any of the parameters described in the previous sentence.

The usage session is a finite usage session; that is a usage session having a start and an end. The duration of the usage session as measured by time may be influenced by use during the usage session. The duration of the usage session may have a maximum duration determined by a maximum time from the start of the usage session. The duration of the usage session may be less than the maximum time if one or more monitored parameters reaches a predetermined threshold before the maximum time from the start of the usage session. By way of example, the one or more monitored parameters may comprise one or more of: i) a cumulative puff count of a series of puffs drawn by a user since the start of the usage session, and ii) a cumulative volume of aerosol evolved from the aerosol-forming substrate since the start of the usage session.

The coupling of the control electronics to the outer and inner lighting arrays as described above allows each lighting array to provide a user with data in a visual format indicative of a state of the device. The use of outer and inner lighting arrays facilitates each lighting array separately conveying different data to a user.

Preferably, the first and second data may be indicative of any two of: a) a power source of the aerosol-generating device containing sufficient energy to complete a single usage session; b) a power source of the aerosol-generating device containing sufficient energy to complete two or more usage sessions; c) a power source of the aerosol-generating device containing a level of energy below a predetermined threshold level of energy; d) selection or activation of one of a first predetermined thermal profile and a second predetermined thermal profile, in which each of the first and second predetermined thermal profiles define a heating profile for heating of the aerosol-forming substrate by an electrical heating arrangement over the usage session, the first and second predetermined thermal profiles being different to each other; e) the aerosol-generating device being in one of a pause mode state or a reactivation state; f) selection or activation of a change in operational state of the aerosol-generating device; g) progression through the usage session; and h) progression through a pre-heating phase in which an electrical heating arrangement is heated to a predetermined target temperature to heat the aerosol-forming substrate. In this manner, the outer and inner lighting arrays facilitate conveying to a user data in a visual format relating to two different states of the device.

The outer lighting array may circumscribe at least 50%, or preferably at least 60%, or preferably at least 70%, or preferably at least 80%, or preferably at least 90%, or preferably all of the perimeter of the inner lighting array. Having the outer lighting array partially or wholly circumscribing the inner lighting array is beneficial in enabling the outer lighting array to convey data to a user indicative of changes over time in the state of the aerosol-generating device. For example, the outer lighting array may facilitate conveying data to a user indicative of progression through the pre-heating phase or of progression through the usage session.

Preferably, the first data may relate to a state of progression of an operational phase of the aerosol-generating device, and the second data may relate to a different state of the aerosol-generating device. The first predetermined light emission may be a predetermined phase progression light emission, and the second predetermined light emission may be a predetermined state light emission. The control electronics may be configured to: i) selectively activate one of the outer and inner lighting arrays to generate the predetermined phase progression light emission indicative of and in response to progression of the operational phase of the aerosol-generating device; and ii) selectively activate the other of the outer and inner lighting arrays to generate the predetermined state light emission indicative of and in response to the different state of the aerosol-generating device. By way of example, the operational phase of the aerosol-generating device may conveniently be the pre-heating phase, or may be the usage session.

With progression through the operational phase, the control electronics may increase or decrease any one or more of: a luminance of the lighting array generating the predetermined phase progression light emission, and a proportion of the lighting array which is activated to generate the predetermined phase progression light emission.

Preferably, the control electronics may be configured to: i) selectively activate the outer lighting array to generate the predetermined phase progression light emission; and ii) selectively activate the inner lighting array to generate the predetermined state light emission. As the outer lighting array partially or wholly surrounds the inner lighting array, the geometry of the outer lighting array makes it particularly suitable for conveying data to a user indicative of progression through an operational phase of the aerosol-generating device, in the form of the predetermined phase progression light emission.

The control electronics may be configured to generate the predetermined phase progression light emission and the predetermined state light emission simultaneously.

Preferably, the control electronics may be configured to progressively reduce an activated area or an activated length of one of the outer lighting array and the inner lighting array with progression through the operational phase of the aerosol-generating device to generate the predetermined phase progression light emission. By "activated area" and "activated length" is meant an area or length of the lighting array from which the predetermined phase progression light emission is emitted. In this manner, a decreasing proportion of one of the outer and inner lighting arrays contributes to the generation of the predetermined phase progression light emission with progression through the operational phase. In this context, the predetermined phase progression light emission resembles a timer counting down with progression through the operational phase. Alternatively, the control electronics may be configured to progressively increase an activated area or an activated length of one of the outer lighting array and the inner lighting array with progression through the operational phase of the aerosol-generating device to generate the predetermined phase progression light emission. In this manner, an increasing proportion of one of the lighting arrays contributes to the generation of the predetermined phase progression light emission with progression through the operational phase.

As indicated in subsequent paragraphs, the lighting arrays may each include a plurality of light emitting elements. Variation in the activated area or the activated length may be achieved by varying the number of the plurality of light emitting elements in the respective lighting array which are activated with progression through the operational phase.

Preferably, one or each of the outer lighting array and the inner lighting array may be an arcuate segment extending around an arc of at least 180 degrees. Advantageously, the arcuate segment may extend around an arc of 360 degrees to define a closed annulus.

The control electronics may be configured to vary an activated thickness of the arcuate segment with respect to time in generating either of the predetermined phase progression light emission or the predetermined state light emission. In this manner, the thickness of the arcuate segment that is illuminated in the generation of the predetermined phase progression light emission or the predetermined state light emission changes with respect to time. The time-dependent variation in the activated thickness may include a progressive increase in the activated thickness followed by a progressive decrease in the activated thickness. The variation in the activated thickness may be cyclical. The arcuate segment of the lighting array may include a plurality of light emitting units extending across the thickness of the segment, with the variation with respect to time of the activated thickness being achieved by varying the number of the light emitting elements which are activated across the thickness.

The control electronics may be configured to progressively reduce an activated length of the arcuate segment with progression through the operational phase of the aerosol-generating device to generate the predetermined phase progression light emission. Alternatively, the control electronics may be configured to progressively increase an activated length of the arcuate segment with progression through the operational phase of the aerosol-generating device to generate the predetermined phase progression light emission. As indicated in preceding paragraphs, the operational phase may be the pre-heating phase in which an electrical heating arrangement for heating of the aerosol-forming substrate is heated to a predetermined target temperature, or may be the usage session.

The arcuate segment may be formed of first and second portions. The control electronics may be configured to progressively reduce an activated length of the first portion with progression through a first usage session to generate a predetermined first usage session light emission; and to progressively reduce an activated length of the second portion with progression through a second usage session to generate a predetermined second usage session light emission. Alternatively, the control electronics may be configured to progressively increase an activated length of the first portion with progression through a first usage session to generate a predetermined first usage session light emission; and to progressively increase an activated length of the second portion with progression through a second usage session to generate a predetermined second usage session light emission. In this manner, each of the first and second portions of the arcuate segment of the respective lighting array is able to provide a user with data in a visual format indicative of progression of a corresponding usage session. The first usage session and second usage session are distinct usage sessions. Preferably, the second usage session is a usage session immediately following the first usage session. Where the aerosol-generating device includes a rechargeable power source, the second usage session may preferably be performed using whatever energy remains in the power source after the first usage session. Preferably, the first and second portions may be symmetrically disposed on opposed sides of a bisector of the arcuate segment.

At least one of the outer lighting array and the inner lighting array may comprise a first arcuate segment and a second arcuate segment. The control electronics may be configured to progressively reduce an activated length of the first arcuate segment with progression through a first usage session to generate a predetermined first usage session light emission; and to progressively reduce an activated length of the second arcuate segment with progression through a second usage session to generate a predetermined second usage session light emission. Alternatively, the control electronics may be configured to progressively increase an activated length of the first arcuate segment with progression through a first usage session to generate a predetermined first usage session light emission; and to progressively increase an activated length of the second arcuate segment with progression through a second usage session to generate a predetermined second usage session light emission. Preferably, one of the first and second arcuate segments may be circumscribed by the other of the first and second arcuate segment.

The control electronics may be configured to activate a first proportion of the arcuate segment to generate a predetermined first state light emission indicative of and in response to the aerosol-generating device being in a first state. The control electronics may further be configured to activate a second proportion of the arcuate segment to generate a predetermined second state light emission indicative of and in response to the aerosol-generating device being in a second state. The second proportion may be greater in size than the first proportion. In this manner, the proportion of the arcuate segment which is activated is able to provide a user with a visual indication as to the aerosol-generating device being in one of two distinct states.

Preferably, the arcuate segment may be formed of first and second portions symmetrically disposed on opposed sides of a bisector of the arcuate segment. The control electronics may be configured to activate the first portion to generate the predetermined first state light emission; and to activate both of the first and second portions of the arcuate segment to generate the predetermined second state light emission. In this manner, distinct portions of the arcuate segment are activated to provide a user with a visual indication as to the aerosol-generating device being in one of two distinct states.

The aerosol-generating device may further comprise a power source coupled to the control electronics. The first state may correspond to the power source containing sufficient energy to complete a single usage session. The second state may correspond to the power source containing sufficient energy to complete two or more usage sessions. In this manner, the predetermined first state light emission would be indicative of the power source containing a level of energy sufficient to complete only a single usage session, whereas the predetermined second state light emission would be indicative of the power source containing a level of energy sufficient to complete two or more usage sessions The aerosol-generating device may further comprise a power source coupled to the control electronics. The first state may correspond to activation by the control electronics of a first predetermined thermal profile for heating of the aerosol-forming substrate by an electrical heating arrangement over the usage session. The second state may correspond to activation by the control electronics of a second predetermined thermal profile for heating of the aerosol-forming substrate by the electrical heating arrangement over the usage session. In this manner, the predetermined first state light emission would be indicative of selection of the first predetermined thermal profile for the electrical heating arrangement over the usage session, and the predetermined second state light emission would be indicative of selection of the second predetermined thermal profile for the electrical heating arrangement over the usage session. The first and second predetermined thermal profiles are different to each other. The second predetermined thermal profile may have a greater intensity than the first predetermined thermal profile. For example, the second predetermined thermal profile may be associated with supply of a greater amount of energy from a power source to the electrical heating arrangement over the usage session than for the first predetermined thermal profile.

The power source may be in the form of a battery, preferably a rechargeable battery.

The control electronics may be configured to selectively activate different parts of the arcuate segment over time such that an activated portion of the arcuate segment travels along the arcuate segment over time to generate one of the predetermined phase progression light emission and the predetermined state light emission.

Conveniently, the state of the aerosol-generating device to which the predetermined state light emission corresponds is a reactivation state or a pause mode state. The reactivation state may correspond to the control electronics controlling a supply of energy from a power source to an electrical heating arrangement to heat the aerosol-forming substrate at a first temperature level in an aerosol-releasing mode. The pause mode state may correspond to the control electronics controlling the supply of energy from a power source to the electrical heating arrangement to heat the aerosol-forming substrate at a second temperature level below the first temperature level.

The control electronics may be configured to progressively increase a dominant wavelength of the predetermined phase progression light emission with progression through the operational phase of the aerosol-generating device. In this manner, the colour of the predetermined phase progression light emission is able to be adjusted to reflect progression through the operational phase. Advantageously, the dominant wavelength is in the range 380 to 500 nanometres at a start of the operational phase and is in the range 590 to 700 nanometres at an end of the operational phase. So, with progression through the operational phase, the colour of the predetermined phase progression light emission may be adjusted from a colour at the blue end of the electromagnetic spectrum to a colour at the red end of the electromagnetic spectrum. Where the operational phase is the pre-heating phase, the increase in the dominant wavelength towards the red end of the electromagnetic spectrum over the pre-heating phase would provide a user of the aerosol-generating device with an indication that the electrical heating arrangement is increasing in temperature as intended.

Advantageously, a predetermined area of the inner lighting array may define a predetermined shape. The control electronics may be configured to activate the predetermined area defining the predetermined shape to generate either of the predetermined first light emission or the predetermined second light emission. In this manner, the shape of the first or second predetermined light emission may be used to provide a user with an indication of a state of the aerosol-generating device.

The aerosol-generating device may comprise a touch-activated interface. The touch-activated interface may be coupled to the control electronics and comprise an activation area contactable by a user's digit so as to provide a user input to the control electronics. Preferably, the touch-activated interface may form part of a display window of either or both of the outer lighting array and the inner lighting array. The activation area may be circumscribed by the outer lighting array. The activation area may be circumscribed by the inner lighting array. The activation area may be defined between the outer lighting array and the inner lighting array. Conveniently, the touch-activated interface may comprise a capacitive panel.

The control electronics may be configured to selectively activate either or both of the outer and inner lighting arrays at two or more luminance levels, so as to vary the luminance with respect to time of at least one of the first predetermined light emission and the second predetermined light emission. The change in luminance with respect to time may be particularly beneficial where the predetermined light emission is indicative of progression of an operational phase of the aerosol-generating device.

The control electronics may be configured to selectively activate either or both of the outer and inner lighting arrays in two or more colour states, so as to vary the colour with respect to time of at least one of the first predetermined light emission and the second predetermined light emission. The change in colour with respect to time may be particularly beneficial where the predetermined light emission is indicative of progression of an operational phase of the aerosol-generating device. By way of example, the change in colour with respect to time may be useful in conveying data to a user indicating a change in temperature, such as a change in temperature of an electrical heating arrangement used to heat the aerosol-forming substrate.

The control electronics may be configured to selectively activate either or both of the outer and inner lighting arrays to vary at least one of the first predetermined light emission and the second predetermined light emission with respect to time by one or more of activating, deactivating and reactivating different portions of the respective lighting array over time.

Preferably, each of the outer and inner lighting arrays may comprise a plurality of light emitting units. Each or different ones of the light emitting units of the respective lighting array may contribute towards the first or second predetermined light emission according to which of the light emitting units is activated by the control electronics at a given instant in time. All or only some of the light emitting units may be used in the generating of the first or second predetermined light emission at a given instant in time. The use of light emitting units in the form of light emitting diodes (LED's) is preferred due to LED's being energy efficient. It is preferred that the aerosol-generating device is sized so as to be handheld and to include a power source to provide portability. As previously indicated, the power source may conveniently be in the form of a rechargeable battery. In this context, the energy efficiency associated with LED's makes them particularly suitable for use in such a handheld portable aerosol-generating device having its own power source. Alternatively however, the light emitting units may instead be comprised of one or more liquid crystal displays, or any other electrically powered light source whose energy and size requirements are suitable for use in an aerosol-generating device.

The aerosol-generating device may also further comprise one or more waveguides configured to direct light generated by one or more of the plurality of light emitting units to one or more display windows for viewing of the first predetermined light emission and the second predetermined light emission by a user. As used herein, the term "waveguide" denotes a structure adapted to guide electromagnetic waves of light. The one or more waveguides may conveniently be in the form of one or more optical fibres or light pipes. Conveniently, each of the light emitting units may be associated with a corresponding waveguide, so that the light emitted from each light emitting unit is conveyed to the one or more display windows via the corresponding waveguide.

Preferably, each one of the light emitting units may be a light emitting diode and the control electronics may comprise a light emitting diode control driver and a separate microcontroller. The control driver may be configured to control a supply of electricity from a power source to one or more of the plurality of light emitting diodes under the control of the microcontroller, so as to generate the first predetermined light emission and the second predetermined light emission. The control driver may be configured to control one or both of the voltage or current level of the supply of electricity.

The plurality of light emitting diodes of each of the outer and inner lighting arrays may comprise a first set of light emitting diodes configured to emit light of a first colour; and a second set of light emitting diodes configured to emit light of a second colour. The light emitting diode control driver may be configured to activate one or more of the light emitting diodes from the first set alone of either or both of the outer and inner lighting arrays, or from the second set alone of either or both of the outer and inner lighting arrays, or from both of the first and second sets of either or both of the outer and inner lighting arrays, so as to control the colour of at least one of the first predetermined light emission and the second predetermined light emission.

The light emitting diode control driver may be configured to control a supply of electricity from a power source to one or more of the plurality of light emitting diodes of either or both of the outer and inner lighting arrays by a pulse width modulation regime having a predetermined resolution, so as to control the luminance of at least one of the first predetermined light emission and the second predetermined light emission, in which the predetermined resolution defines two or more luminance levels. By way of example, the resolution of the pulse width modulation regime may be 8 bit (having 256 levels), 10 bit (having 1024 levels), or 12 bit (having 4096 levels). The higher the predetermined resolution, the greater the number of discrete static luminance levels of light which may be generated by each one of the plurality of light emitting diodes. In this manner, the granularity or level of detail of data conveyed to the user through the different luminance levels may be controlled by the predetermined resolution chosen for the light emitting diode control driver.

Preferably, the aerosol-forming substrate is a solid aerosol-forming substrate. However, the aerosol-forming substrate may comprise both solid and liquid components. Alternatively, the aerosol-forming substrate may be a liquid aerosol-forming substrate.

Preferably, the aerosol-forming substrate comprises nicotine. More preferably, the aerosol-forming substrate comprises tobacco. Alternatively or in addition, the aerosol-forming substrate may comprise a non-tobacco containing aerosol-forming material.

If the aerosol-forming substrate is a solid aerosol-forming substrate, the solid aerosol-forming substrate may comprise, for example, one or more of: powder, granules, pellets, shreds, strands, strips or sheets containing one or more of: herb leaf, tobacco leaf, tobacco ribs, expanded tobacco and homogenised tobacco.

Optionally, the solid aerosol-forming substrate may contain tobacco or non-tobacco volatile flavour compounds, which are released upon heating of the solid aerosol-forming substrate. The solid aerosol-forming substrate may also contain one or more capsules that, for example, include additional tobacco volatile flavour compounds or non-tobacco volatile flavour compounds and such capsules may melt during heating of the solid aerosol-forming substrate.

Optionally, the solid aerosol-forming substrate may be provided on or embedded in a thermally stable carrier. The carrier may take the form of powder, granules, pellets, shreds, strands, strips or sheets. The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

In a preferred embodiment, the aerosol-forming substrate comprises homogenised tobacco material. As used herein, the term "homogenised tobacco material" refers to a material formed by agglomerating particulate tobacco.

Preferably, the aerosol-forming substrate comprises a gathered sheet of homogenised tobacco material. As used herein, the term "sheet" refers to a laminar element having a width and length substantially greater than the thickness thereof. As used herein, the term "gathered" is used to describe a sheet that is convoluted, folded, or otherwise compressed or constricted substantially transversely to the longitudinal axis of the aerosol-generating article.

Preferably, the aerosol-forming substrate comprises an aerosol former. As used herein, the term "aerosol former" is used to describe any suitable known compound or mixture of compounds that, in use, facilitates formation of an aerosol and that is substantially resistant to thermal degradation at the operating temperature of the aerosol-generating article.

Suitable aerosol-formers are known in the art and include, but are not limited to: polyhydric alcohols, such as propylene glycol, triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers are polyhydric alcohols or mixtures thereof, such as propylene glycol, triethylene glycol, 1,3-butanediol and, most preferred, glycerine.

The aerosol-forming substrate may comprise a single aerosol former. Alternatively, the aerosol-forming substrate may comprise a combination of two or more aerosol formers.

The invention is defined in the claims. However, below there is provided a non-exhaustive list of non-limiting examples. Any one or more of the features of these examples may be combined with any one or more features of another example, embodiment, or aspect described herein.

Example Ex1: An aerosol-generating device for heating an aerosol-forming substrate to generate an inhalable aerosol during a usage session, the aerosol-generating device comprising: control electronics; an outer lighting array partially or wholly surrounding an inner lighting array; in which the control electronics are coupled to the outer and inner lighting arrays and configured to: i) selectively activate one of the outer and inner lighting arrays to generate a first predetermined light emission conveying first data indicative of a state of the aerosol-generating device; and ii) selectively activate the other of the outer and inner lighting arrays to generate a second predetermined light emission conveying second data indicative of a state of the aerosol-generating device, wherein the first data and the second data are different from one another.

Example Ex2: An aerosol-generating article according to Ex1, in which the first and second data are indicative of any two of: a) a power source of the aerosol-generating device containing sufficient energy to complete a single usage session; b) a power source of the aerosol-generating device containing sufficient energy to complete two or more usage sessions; c) a power source of the aerosol-generating device containing a level of energy below a predetermined threshold level of energy; d) selection or activation of one of a first predetermined thermal profile and a second predetermined thermal profile, in which each of the first and second predetermined thermal profiles define a heating profile for heating of the aerosol-forming substrate by an electrical heating arrangement over the usage session, the first and second predetermined thermal profiles being different to each other; e) the aerosol-generating device being in one of a pause mode state or a reactivation state; f) selection or activation of a change in operational state of the aerosol-generating device; g) progression through the usage session; and h) progression through a pre-heating phase in which an electrical heating arrangement is heated to a predetermined target temperature.

Example Ex3: An aerosol-generating device according to either one of Ex1 or Ex2, in which the outer lighting array circumscribes at least 50%, or preferably at least 60%, or preferably at least 70%, or preferably at least 80%, or preferably at least 90%, or preferably all of the perimeter of the inner lighting array.

Example Ex4: An aerosol-generating device according to any one of the preceding claims, in which the first data relates to a state of progression of an operational phase of the aerosol-generating device, the second data relates to a different state of the aerosol-generating device, the first predetermined light emission is a predetermined phase progression light emission, and the second predetermined light emission is a predetermined state light emission; wherein the control electronics are configured to: i) selectively activate one of the outer and inner lighting arrays to generate the predetermined phase progression light emission indicative of and in response to progression of the operational phase of the aerosol-generating device; and ii) selectively activate the other of the outer and inner lighting arrays to generate the predetermined state light emission indicative of and in response to the different state of the aerosol-generating device.

Example Ex5: An aerosol-generating device according to Ex4, in which the operational phase is a pre-heating phase in which an electrical heating arrangement for heating of the aerosol-forming substrate is heated to a predetermined target temperature.

Example Ex6: An aerosol-generating device according to Ex 4, in which the operational phase is the usage session.

Example Ex7: An aerosol-generating device according to any one of Ex4 to Ex6, in which the control electronics are configured to: i) selectively activate the outer lighting array to generate the predetermined phase progression light emission; and ii) selectively activate the inner lighting array to generate the predetermined state light emission.

Example Ex8: An aerosol-generating device according to any one of Ex4 to Ex7, in which the control electronics are configured to generate the predetermined phase progression light emission and the predetermined state light emission simultaneously.

Example Ex9: An aerosol-generating device according to any one of Ex4 to Ex8, in which the control electronics are configured to progressively reduce an activated area or an activated length of one of the outer lighting array and the inner lighting array with progression through the operational phase of the aerosol-generating device to generate the predetermined phase progression light emission.

Example Ex10: An aerosol-generating device according to any one of Ex4 to Ex9, in which the control electronics are configured to progressively increase an activated area or an activated length of one of the outer lighting array and the inner lighting array with progression through the operational phase of the aerosol-generating device to generate the predetermined phase progression light emission.

Example Ex11: An aerosol-generating device according to any one of Ex1 to Ex10, in which one or each of the outer lighting array and the inner lighting array is an arcuate segment extending around an arc of at least 180 degrees.

Example Ex12: An aerosol-generating device according to Ex11, in which the arcuate segment extends around an arc of 360 degrees to define a closed annulus.

Example Ex13: An aerosol-generating device according to either one of Ex11 or Ex12, in which the control electronics are configured to vary an activated thickness of the arcuate segment with respect to time in generating either of the predetermined phase progression light emission or the predetermined state light emission.

Example EX14: An aerosol-generating device according to any one of Ex11 to Ex13, in which the control electronics are configured to progressively reduce an activated length of the arcuate segment with progression through the operational phase of the aerosol-generating device to generate the predetermined phase progression light emission.

Example Ex15: An aerosol-generating device according to any one of Ex11 to Ex13, in which the control electronics are configured to progressively increase an activated length of the arcuate segment with progression through the operational phase of the aerosol-generating device to generate the predetermined phase progression light emission.

Example Ex16: An aerosol-generating device according to any one of Ex11 to Ex15, in which the arcuate segment is formed of first and second portions, in which the control electronics are configured to: progressively reduce an activated length of the first portion with progression through a first usage session to generate a predetermined first usage session light emission; and progressively reduce an activated length of the second portion with progression through a second usage session to generate a predetermined second usage session light emission.

Example Ex17: An aerosol-generating device according to any one of Ex11 to Ex15, in which the arcuate segment is formed of first and second portions, in which the control electronics are configured to: progressively increase an activated length of the first portion with progression through a first usage session to generate a predetermined first usage session light emission; and progressively increase an activated length of the second portion with progression through a second usage session to generate a predetermined second usage session light emission.

Example Ex18: An aerosol-generating device according to either one of Ex16 or Ex17, in which the first and second portions are symmetrically disposed on opposed sides of a bisector of the arcuate segment.

Example Ex19: An aerosol-generating device according to any one of Ex11 to Ex15, in which at least one of the outer lighting array and the inner lighting array comprises a first arcuate segment and a second arcuate segment, in which the control electronics are configured to: progressively reduce an activated length of the first arcuate segment with progression through a first usage session to generate a predetermined first usage session light emission; and progressively reduce an activated length of the second arcuate segment with progression through a second usage session to generate a predetermined second usage session light emission.

Example Ex20: An aerosol-generating device according to any one of Ex11 to Ex15, in which one of the outer lighting array and the inner lighting array comprises a first arcuate segment and a second arcuate segment, in which the control electronics are configured to: progressively increase an activated length of the first arcuate segment with progression through a first usage session to generate a predetermined first usage session light emission; and progressively increase an activated length of the second arcuate segment with progression through a second usage session to generate a predetermined second usage session light emission.

Example Ex21: An aerosol-generating device according to either one of Ex19 or Ex20, wherein one of the first and second arcuate segments is circumscribed by the other of the first and second arcuate segments.

Example Ex22: An aerosol-generating device according to any one of Ex11 to Ex21, in which the control electronics are configured to: activate a first proportion of the arcuate segment to generate a predetermined first state light emission indicative of and in response to the aerosol-generating device being in a first state; and activate a second proportion of the arcuate segment to generate a predetermined second state light emission indicative of and in response to the aerosol-generating device being in a second state; in which the second proportion is greater in size than the first proportion.

Example Ex23: An aerosol-generating device according to Ex22, in which the arcuate segment is formed of first and second portions symmetrically disposed on opposed sides of a bisector of the arcuate segment, in which the control electronics are configured to: activate the first portion to generate the predetermined first state light emission; and activate both of the first and second portions of the arcuate segment to generate the predetermined second state light emission.

Example Ex24: An aerosol-generating device according to either one of Ex22 or Ex23, the aerosol-generating device further comprising: a power source coupled to the control electronics; in which the first state corresponds to the power source containing sufficient energy to complete a single usage session, and the second state corresponds to the power source containing sufficient energy to complete two or more usage sessions.

Example Ex25: An aerosol-generating device according to either one of Ex22 or Ex23, the aerosol-generating device further comprising: a power source coupled to the control electronics; in which the first state corresponds to activation by the control electronics of a first predetermined thermal profile for heating of the aerosol-forming substrate by an electrical heating arrangement over the usage session, and the second state corresponds to activation by the control electronics of a second predetermined thermal profile for heating of the aerosol-forming substrate by the electrical heating arrangement over the usage session.

Example Ex26: An aerosol-generating device according to any one of Ex11 to Ex25, in which the control electronics are configured to selectively activate different parts of the arcuate segment over time such that an activated portion of the arcuate segment travels along the arcuate segment over time to generate one of the predetermined phase progression light emission and the predetermined state light emission.

Example Ex27: An aerosol-generating device according to Ex26, wherein the state of the aerosol-generating device to which the predetermined state light emission corresponds is a reactivation state or a pause mode state.

Example Ex28: An aerosol-generating device according to Ex27, in which the reactivation state corresponds to the control electronics controlling a supply of energy from a power source to an electrical heating arrangement to heat the aerosol-forming substrate at a first temperature level in an aerosol-releasing mode, and the pause mode state corresponds to the control electronics controlling the supply of energy from the power source to the electrical heating arrangement to heat the aerosol-forming substrate at a second temperature level below the first temperature level.

Example Ex29: An aerosol-generating device according to any one of Ex4 to Ex28, in which the control electronics are configured to progressively increase a dominant wavelength of the predetermined phase progression light emission with progression through the operational phase of the aerosol-generating device.

Example Ex30: An aerosol-generating device according to Ex29, in which the dominant wavelength is in the range 380 to 500 nanometres at a start of the operational phase and is in the range 590 to 700 nanometres at an end of the operational phase.

Example Ex31: An aerosol-generating device according to any one of Ex1 to Ex30, in which a predetermined area of the inner lighting array defines a predetermined shape, the control electronics configured to activate the predetermined area defining the predetermined shape to generate either of the first predetermined light emission or the second predetermined light emission.

Example Ex32: An aerosol-generating device according to any one of Ex1 to Ex31, the aerosol-generating device comprising a touch-activated interface, the touch-activated interface coupled to the control electronics and comprising an activation area contactable by a user's digit so as to provide a user input to the control electronics.

Example Ex33: An aerosol-generating device according to Ex32, in which the touch-activated interface forms part of a display window of either or both of the outer lighting array and the inner lighting array.

Example Ex34: An aerosol-generating device according to either one of Ex32 or Ex33, in which the activation area is circumscribed by the outer lighting array.

Example Ex35: An aerosol-generating device according to any one of Ex32 to Ex34, in which the activation area is circumscribed by the inner lighting array.

Example Ex36: An aerosol-generating device according to Ex32, in which the activation area is defined between the outer lighting array and the inner lighting array.

Example Ex37: An aerosol-generating device according to any one of Ex32 to Ex36, in which the touch-activated interface comprises a capacitive panel.

Example Ex38: An aerosol-generating device according to any one of Ex1 to Ex37, in which the control electronics are configured to selectively activate either or both of the outer and inner lighting arrays at two or more luminance levels, so as to vary the luminance with respect to time of at least one of the first predetermined light emission and the second predetermined light emission.

Example Ex39: An aerosol-generating device according to any one of Ex1 to Ex38, in which the control electronics are configured to selectively activate either or both of the outer and inner lighting arrays in two or more colour states, so as to vary the colour with respect to time of at least one of the first predetermined light emission and the second predetermined light emission.

Example Ex40: An aerosol-generating device according to any one of Ex1 to Ex39, in which the control electronics are configured to selectively activate either or both of the outer and inner lighting arrays to vary at least one of the first predetermined light emission and the second predetermined light emission with respect to time by one or more of activating, deactivating and reactivating different portions of the respective lighting array over time.

Example Ex41: An aerosol-generating device according to any one of Ex1 to Ex40, in which each of the outer and inner lighting arrays comprise a plurality of light emitting units.

Example Ex42: An aerosol-generating device according to Ex41, further comprising one or more waveguides configured to direct light generated by one or more of the plurality of light emitting units to one or more display windows for viewing of the first predetermined light emission and second predetermined light emission by a user.

Example Ex43: An aerosol-generating device according to either one of Ex41 or Ex42, wherein each one of the light emitting units is a light emitting diode and the control electronics comprises a light emitting diode control driver and a separate microcontroller, the control driver configured to control a supply of electricity from a power source to one or more of the plurality of light emitting diodes under the control of the microcontroller, so as to generate the first predetermined light emission and the second predetermined light emission.

Example Ex44: An aerosol-generating device according to Ex43, in which the plurality of light emitting diodes of each of the outer and inner lighting arrays comprises: a first set of light emitting diodes configured to emit light of a first colour; and a second set of light emitting diodes configured to emit light of a second colour; in which the light emitting diode control driver is configured to activate one or more of the light emitting diodes from the first set alone of either or both of the outer and inner lighting arrays, or from the second set alone of either or both of the outer and inner lighting arrays, or from both of the first and second sets of either or both of the outer and inner lighting arrays, so as to control the colour of at least one of the first predetermined light emission and the second predetermined light emission.

Example Ex45: An aerosol-generating device according to either one of Ex43 or Ex44, in which the light emitting diode control driver is configured to control a supply of electricity from a power source to one or more of the plurality of light emitting diodes of either or both of the outer and inner lighting arrays by a pulse width modulation regime having a predetermined resolution, so as to control the luminance of at least one of the first predetermined light emission and the second predetermined light emission, in which the predetermined resolution defines two or more luminance levels.

Figure 2:
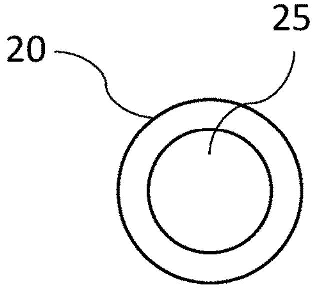
FIG. 2 illustrates a schematic upper end view of the aerosol-generating device of FIG. 1.
Figure 3:
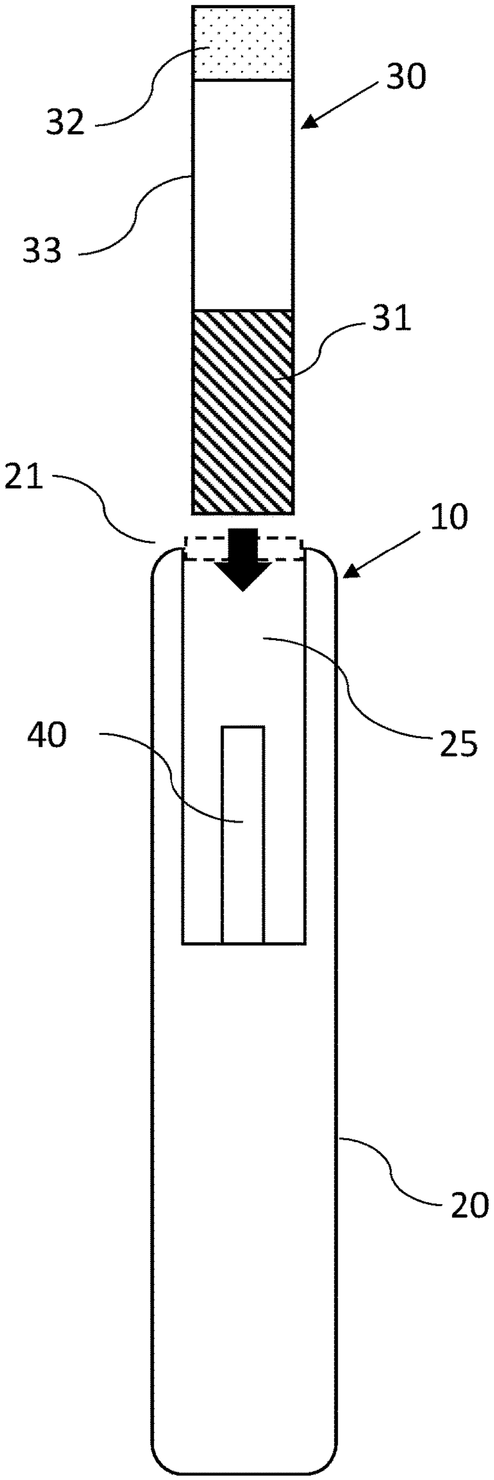
FIG. 3 illustrates a schematic cross-sectional side view of the aerosol-generating device of FIG. 1 and an aerosol-generating article for use with the device.

An exemplary aerosol-generating device 10 is a hand-held aerosol generating device, and has an elongate shape defined by a housing 20 that is substantially circularly cylindrical in form (see FIGS. 1 and 2). As shown in FIGS. 2 and 3, the aerosol-generating device 10 comprises an open cavity 25 located at a proximal end 21 of the housing 20 for receiving an aerosol-generating article 30. Additionally, the aerosol-generating device 10 further has an electrically operated heater element 40 arranged to heat at least an aerosol-forming substrate 31 of the aerosol-generating article 30 when the aerosol-generating article is received in the cavity 25 (see FIG. 3).

The aerosol-generating device is configured to receive the aerosol-generating article 30. As shown in FIG. 3, the aerosol-generating article 30 has the form of a cylindrical rod, the rod formed by a combination of the aerosol-forming substrate 31 and a filter element 32. The aerosol-forming substrate 31 and filter element 32 are co-axially aligned and enclosed in a wrapper 33 of cigarette paper. The aerosol-forming substrate 31 is a solid aerosol-forming substrate comprising tobacco. However, in alternative embodiments (not shown), the aerosol-forming substrate 31 may instead be a liquid aerosol-forming substrate or formed of a combination of liquid and solid aerosol-forming substrates. The filter element 32 serves as a mouthpiece of the aerosol-generating article 30. The aerosol-generating article 30 has a diameter substantially equal to the diameter of the cavity 25 of the device 10 and a length longer than a depth of the cavity 25. When the aerosol-generating article 30 is received in the cavity 25 of the device 10, the portion of the article containing the filter element 32 extends outside of the cavity and may be drawn on by a user, in a similar manner to a conventional cigarette.

An outer lighting array 61 and an inner lighting array 62 are incorporated into the housing 20 of the aerosol-generating device 10 (see FIG. 1). The outer lighting array 61 extends around an arc of 360 degrees to define a closed annulus surrounding the inner lighting array 62. The inner lighting array 62 is generally oval in shape. The outer lighting array 61 includes an arrangement of a plurality of light emitting diodes 611-1 . . . n, which are arranged around the lighting array. Although the schematic representation of FIG. 1 only shows a single light emitting diode across the thickness of the annulus defined by the outer lighting array 61, a plurality of light emitting diodes may be arranged across the thickness of the annulus. The inner lighting array 62 also includes an arrangement of a plurality of light emitting diodes 621-1 . . . n, which are arranged across an area defined by the inner lighting array. Each of the outer and inner lighting arrays 61, 62 has a respective display window 612, 622 which forms part of the exterior surface of the housing 20 and is transparent to light. As will be described in more detail below, in use, light generated by the light emitting diodes of the outer and inner lighting arrays 61, 62 is directed towards the respective display window 612, 622 so as to be visible to a user of the aerosol-generating device 10.

Figure 4:
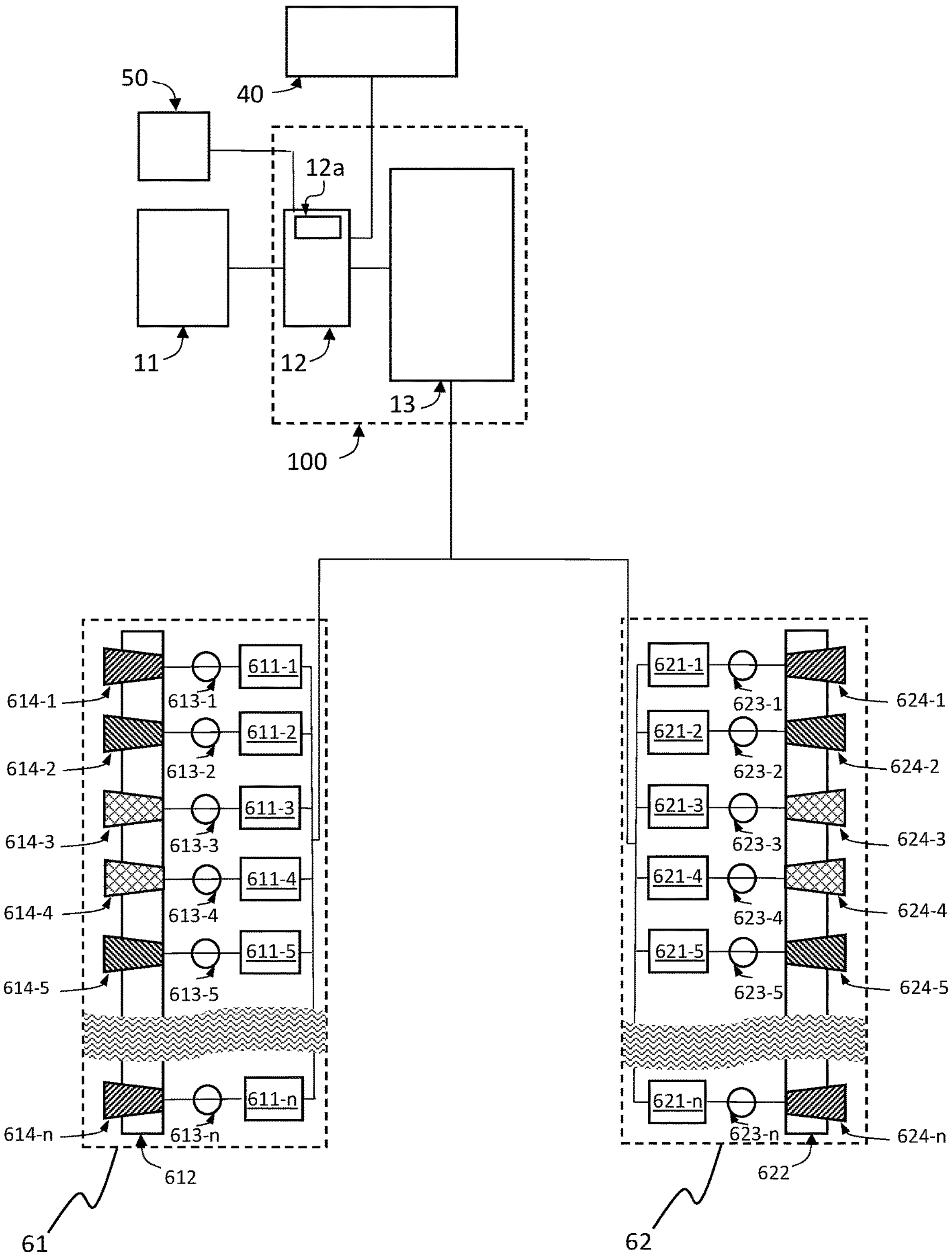
FIG. 4 is a block diagram providing a schematic illustration of various electronic components of the aerosol-generating device of FIGS. 1 to 3 and their interactions.

A battery 11 and microcontroller 12 are coupled to each other and located within the housing 20 (see FIG. 4). The microcontroller 12 also incorporates a memory module 12*a*. The microcontroller 12 is in turn coupled to both the heater element 40 and a lighting control driver 13. The microcontroller 12 and lighting control driver 13 collectively form a control electronics section 100 of the aerosol-generating device 10. The lighting control driver 13 is coupled to each of the light emitting diodes 611-1 . . . n of the outer lighting array 61 and each of the light emitting diodes 621-1 . . . n of the inner lighting array 62. For the outer lighting array 61, waveguides 613-1 . . . n are provided between the light emitting diodes 611-1 . . . n and the display window 612. Similarly, for the inner lighting array 62, waveguides 623-1 . . . n are provided between the light emitting diodes 621-1 . . . n and the display window 622. Each one of the waveguides 613-1 . . . n, 623-1 . . . n is associated with a respective one of the light emitting diodes 611-1 . . . n, 621-1 . . . n of the respective lighting array 61, 62. The association is such that, in use, each waveguide functions to direct light generated by an associated one of the light emitting diodes to the respective display window 612, 622. The waveguides 613-1 . . . n, 623-1 . . . n are in the form of discrete lengths of optical fibre.

The memory module 12*a* contains instructions for execution by the microcontroller 12 and lighting control driver 13 during use of the device 10. The instructions stored in the memory module 12*a* include data on two or more user-selectable predetermined thermal profiles for the heater element 40, criteria determining the duration of a usage session, plus other data and information relevant to control and operation of the aerosol-generating device 10. When activated, the microcontroller 12 accesses the instructions contained in the memory module 12*a* and controls a supply of energy from the battery 11 to the heater element 40 according to the instructions contained in the memory module 12*a*. The microcontroller 12 also controls a supply of energy to the lighting control driver 13. In turn, the lighting control driver 13 individually controls a supply of electricity to each of the light emitting diodes 611-1 . . . n, 621-1 . . . n of the outer and inner lighting arrays 61, 62, such that each light emitting diode emits light 614-1 . . . n, 624-1 . . . n at one of a plurality of discrete static luminance levels under the control of the lighting control driver (see FIG. 4). The light emitted by different lighting emitting diodes of the outer lighting array 61 under the control of the lighting control driver 13 together forms a predetermined light emission from that lighting array. Similarly, the light emitted by different light emitting diodes of the inner lighting array 62 under the control of the lighting control driver 13 together forms a predetermined light emission from that lighting array. The three different forms of cross-hatching used in FIG. 4 for the light 614-1 . . . n, 624-1 . . . n generated by different ones of the light emitting diodes of the outer and inner lighting arrays 61, 62 represent three different static luminance levels.

In use, a user first inserts the aerosol-generating article 30 into the cavity 25 of the aerosol-generating device 10 (as shown by the arrow in FIG. 3) and turns on the device 10 by pressing a user button 50 to activate the heater element 40 to start a usage session. The button 50 is electro-mechanically coupled to the microcontroller 12 (see FIG. 4). In the embodiment shown, the button 50 also serves as a means for the user to select a given one of the predetermined thermal profiles stored in the memory module 12*a*. For the embodiment shown, a double-press of the button 50 functions to select a first predetermined thermal profile and a triple-press of the button functions to select a second predetermined thermal profile. However, in alternative embodiments (not shown), an alternative user interface may be provided with which a user can interact to select a desired one of the first and second predetermined thermal profiles. Such an alternative user interface may be in the form of a touch sensitive capacitive panel with which a user may engage a finger to select a desired one of the predetermined thermal profiles, the touch sensitive panel coupled to the microcontroller 12. The touch sensitive capacitive panel may be integrated into the display window 622 of the inner lighting array 62 and coupled to the microcontroller 12. A user may then touch or swipe their finger along the touch sensitive capacitive panel defined by the display window 622 to provide a control input to the device 10. Alternatively, the alternative user interface may include a motion or orientation sensor coupled to the microcontroller 12, in which a motion or gesture of the device 10 in a predetermined manner is detected by the sensor and serves as a means of selecting a specific one of the predetermined thermal profiles. The first and second predetermined thermal profiles differ from each other in their intensity, with the second predetermined thermal profile having a greater intensity than the first predetermined thermal profile. The second predetermined thermal profile is associated with supply of a greater amount of energy from the battery 11 to the heater element 40 over the usage session than for the first predetermined thermal profile.

After activation, the temperature of the heater element 40 is increased in a pre-heating phase from an ambient temperature to a predetermined target temperature for heating the aerosol-forming substrate 31 according to the selected predetermined thermal profile. On attainment of the predetermined target temperature, the usage session commences. Over the usage session, the heater element 40 heats the aerosol-forming substrate 31 of the article 30 such that volatile compounds of the aerosol-forming substrate are released and atomised to form an aerosol. The user draws on the filter element 32 of the article 30 and inhales the aerosol generated from the heated aerosol-forming substrate 31. The microcontroller 12 is configured to control the supply of energy from the battery 11 to maintain the heater element 40 at an approximately constant level as a user puffs on the article 30. The heater element 40 continues to heat the aerosol-generating article 30 in accordance with the selected predetermined thermal profile until an end of the usage session. At the end of the usage session, the heater element 40 is deactivated and allowed to cool. The usage session has a maximum duration defined by the first to occur of i) 6 minutes elapsing from activation of the heater element 40, or ii) the application by a user of 12 consecutive puffs to the aerosol-generating article 30. In an alternative embodiment, the maximum duration of the usage session is instead defined by the first to occur of i) 6 minutes elapsing from activation of the heater element 40, or ii) a cumulative volume of aerosol evolved from the aerosol-forming substrate over the usage session reaching a predetermined volume. In the illustrated embodiment, the heater element 40 is a resistance heater element. However, in other embodiments (not shown), the heater element 40 is instead in the form of a susceptor arranged within a fluctuating magnetic field such that it is heated by induction.

At the end of the usage session, the aerosol-generating article 30 is removed from the device 10 for disposal, and the device may be coupled to an external power source for charging of the battery 11 of the device.

Figure 5:
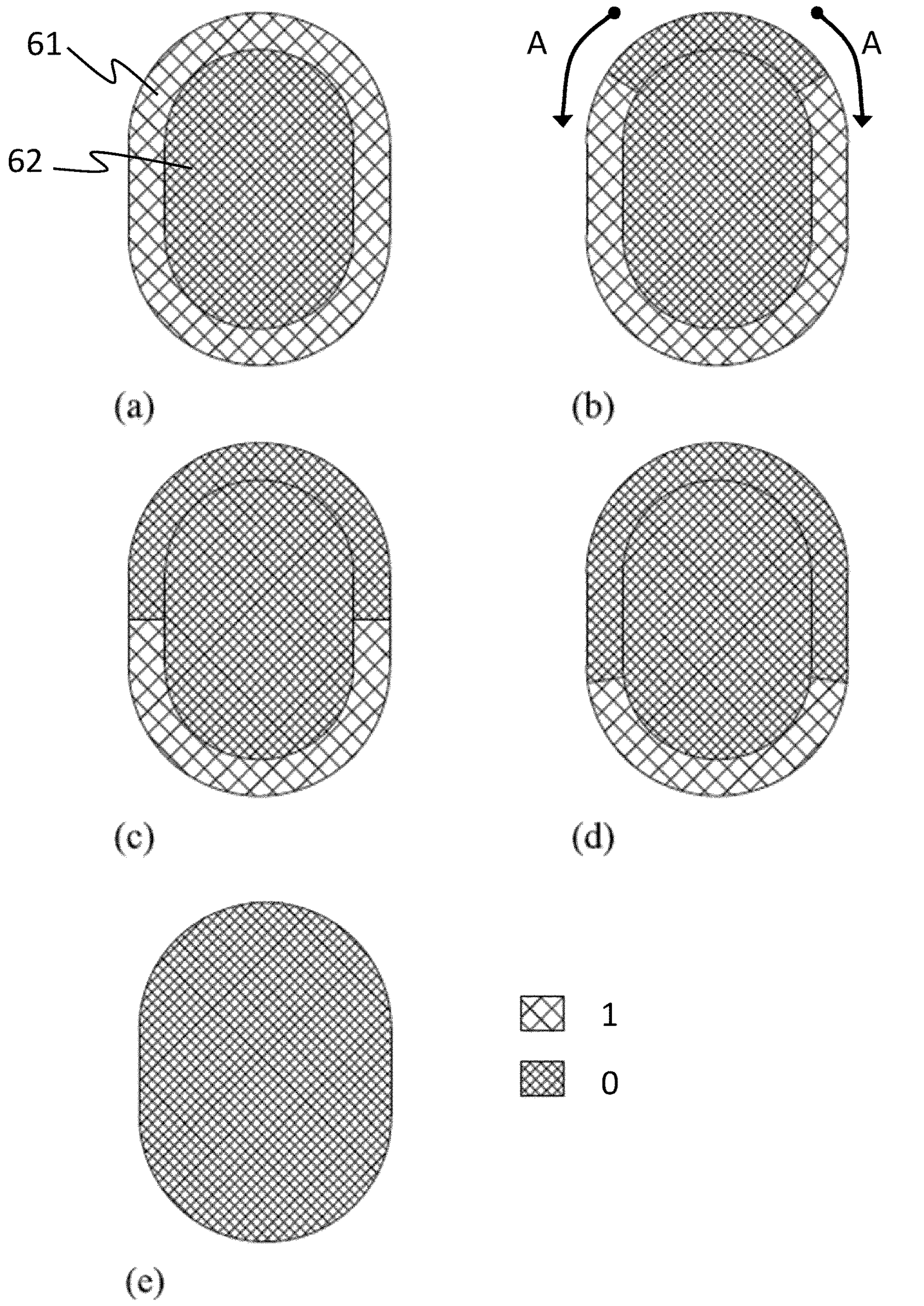
FIG. 5 illustrates an example of how a lighting control driver of the aerosol-generating device of FIGS. 1 to 4 controls a supply of energy to an outer lighting array of the device to generate a predetermined light emission indicative of progression through a usage session.

FIG. 5 illustrates an example of how the lighting control driver 13 controls a supply of electricity from the battery 11 to individual ones of the light emitting diodes 611-1 . . . n of the outer lighting array 61 to generate a predetermined light emission indicative of progression through a usage session of the aerosol-generating device 10. At the start of the usage session, the lighting control driver 13 controls a supply of energy from the battery 11 to light emitting diodes of the outer lighting array such that the entire annulus of the lighting array 61 is illuminated in the generation of a light emission indicative of the start of the usage session. FIGS. 5(*a*) to (*e*) show how, with progression through the usage session, different ones of the light emitting diodes 611-1 . . . n of the outer lighting array 61 are progressively deactivated to reduce the proportion or "length" of the outer lighting array which is activated. Arrows 'A' in FIG. 5(*b*) show the direction in which different light emitting diodes of the outer lighting array 61 are progressively deactivated over the usage session. The legend in FIG. 5 shows two different static luminance levels for the light emission generated by the light emitting diodes of the outer lighting array 61. These luminance levels are designated as levels 1 and 0. Level 1 represents a maximum luminance level, where level 0 represents a deactivated or "off" state in which no light is emitted. On completion of the usage session, all of the light emitting diodes 611-1 . . . n of the outer lighting array 61 are deactivated so that no light is emitted from the outer lighting array. Over the entire duration of the usage session to which FIG. 5 relates, the lighting control driver 13 maintains the light emitting diodes 621-1 . . . n of the inner lighting array 62 in the deactivated or "off" state.

Figure 6:
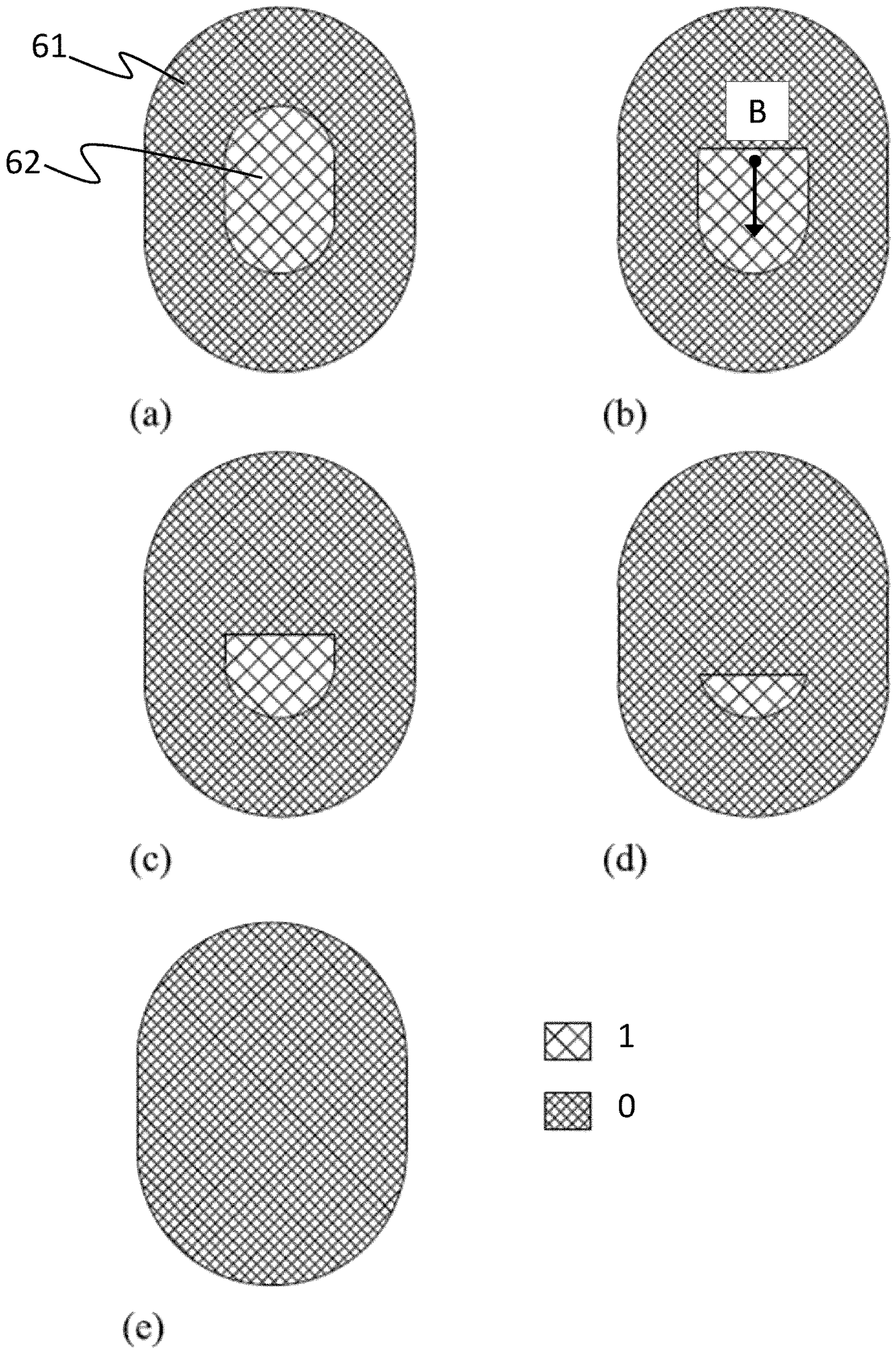
FIG. 6 illustrates an example of how the lighting control driver of the aerosol-generating device of FIGS. 1 to 4 controls a supply of energy to an inner lighting array of the device to generate a predetermined light emission indicative of progression through a usage session.

FIG. 6 illustrates an example of how the lighting control driver 13 controls a supply of electricity from the battery 11 to individual ones of the light emitting diodes 621-1 . . . n of the inner lighting array 62 to generate a predetermined light emission indicative of progression through a usage session of the aerosol-generating device 10. At the start of the usage session, the lighting control driver 13 controls the supply of energy from the battery 11 to light emitting diodes of the inner lighting array such that an oval-shaped area of the lighting array 62 is illuminated in the generation of a light emission indicative of the start of the usage session. FIGS. 6(*a*) to (*e*) show how, with progression through the usage session, different ones of the light emitting diodes of the inner lighting array 62 are progressively deactivated to reduce the proportion or area of the inner lighting array which is activated. Arrow B' in FIG. 6(*b*) shows the direction in which different light emitting diodes of the inner lighting array 62 are progressively deactivated over the usage session. As for the example of FIG. 5, the legend in FIG. 6 shows two different static luminance levels for the light emission generated by light emitting diodes of the inner lighting array 62. These luminance levels are again designated as levels 1 and 0, with level 1 representing a maximum luminance level and level 0 corresponding to a deactivated or "off" state in which no light is emitted. On completion of the usage session, all of the light emitting diodes of the inner lighting array 62 are deactivated, with no light emitted from the inner lighting array. As can be seen, over the entire duration of the usage session to which FIG. 6 relates, the lighting control driver 13 maintains the light emitting diodes of the outer lighting array 61 in the deactivated or "off" state.

Figure 7:
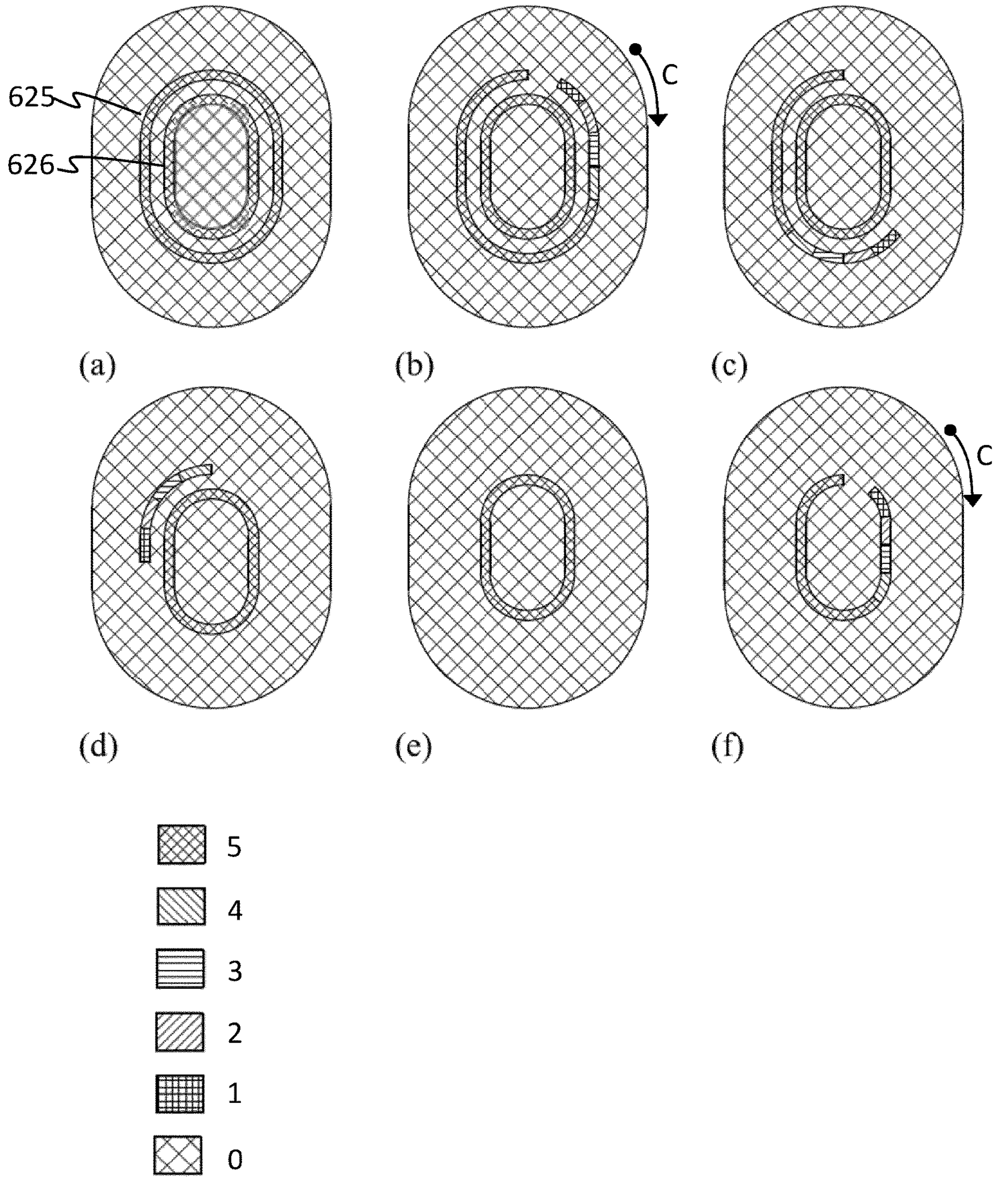
FIG. 7 illustrates an example the lighting control driver of the aerosol-generating device of FIGS. 1 to 4 controls a supply of energy to the inner lighting array of the device to generate predetermined light emissions indicative of progression through distinct first and second usage sessions.

FIG. 7 illustrates an example of how the lighting control driver 13 controls a supply of electricity from the battery 11 to individual ones of the light emitting diodes 621-1 . . . n of the inner lighting array 62 to generate a predetermined light emission indicative of progression through distinct first and second usage sessions of the aerosol-generating device 10. The second usage session follows the first usage session, using whatever energy remains in the battery 11 after completion of the first usage session. Prior to commencement of the first usage session, the lighting control driver 13 controls the supply of energy from the battery 11 to light emitting diodes of the inner lighting array such that two annular rings 625 and 626 are illuminated (see FIG. 7(*a*)). Illuminated annular outer ring 625 circumscribes illuminated annular inner ring 626. Illumination of the entire perimeter of both the outer and inner rings 625, 626 provides a light emission indicative of the battery 11 being fully charged and containing sufficient energy to complete two usage sessions. FIGS. 7(*a*) to (*e*) show how, with progression through the first usage session, different ones of the light emitting diodes of the inner lighting array 62 are progressively deactivated with progression through the first usage session to reduce the proportion or "length" of the outer ring 615 which is illuminated. Arrow 'C' in FIG. 7(*b*) shows the direction in which different light emitting diodes of the inner lighting array 62 are progressively deactivated over the first usage session to reduce the proportion or length of the outer ring 625 which is illuminated. The legend in FIG. 7 shows six different luminance levels for the light emission generated by light emitting diodes of the inner lighting array 62. These luminance levels are designated as levels 5, 4, 3, 2, 1 and 0, in order of decreasing luminance. Level 5 represents a maximum luminance level, whereas level 0 represents a deactivated or "off" state in which no light is emitted. On completion of the first usage session, all of the light emitting diodes which contributed to illumination of the outer ring 625 are deactivated, leaving the inner ring 626 fully illuminated over its entire perimeter. On commencing the second usage session, different ones of the light emitting diodes of the inner lighting array 62 are progressively deactivated with progression through the second usage session to reduce the proportion or length of the inner ring 626 which is illuminated (see FIG. 7(*f*)). Arrow 'C' in FIG. 7(*f*) shows the direction in which different light emitting diodes of the inner lighting array 62 are progressively deactivated over the second usage session to reduce the proportion or length of the inner ring 626 which is illuminated. Although FIG. 7 does not show the entire duration of the second usage session, on completion of the second usage session all of the light emitting diodes of the inner lighting array 62 which contributed to illumination of the inner ring 626 are deactivated to indicate completion of the second usage session. Over the entire duration of both the first and second usage sessions to which FIG. 7 relates, the lighting control driver 13 maintains the light emitting diodes of the outer lighting array 61 in the deactivated or "off" state.

Figure 8:
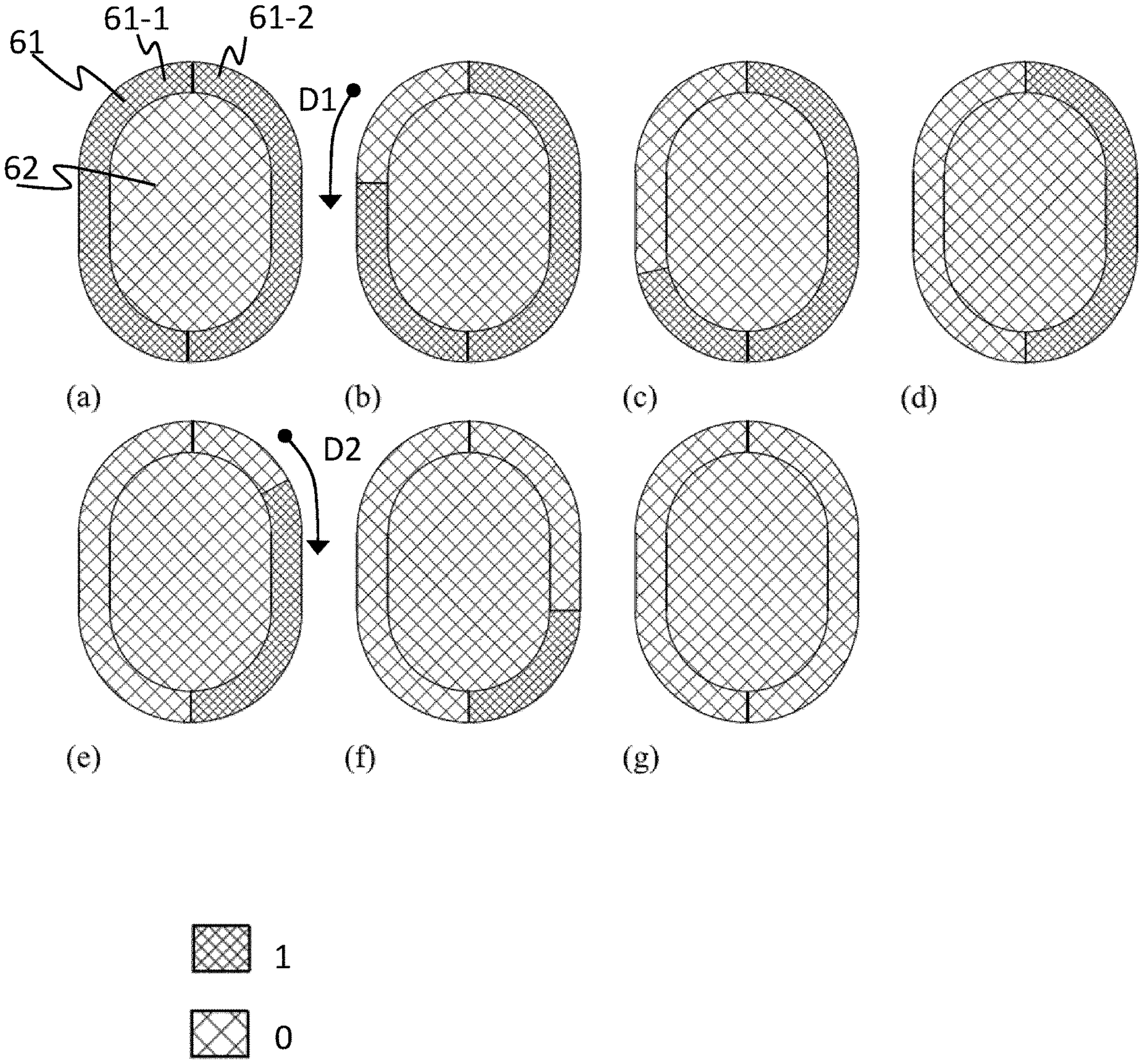
FIG. 8 illustrates an example the lighting control driver of the aerosol-generating device of FIGS. 1 to 4 controls a supply of energy to the outer lighting array of the device to generate predetermined light emissions indicative of progression through distinct first and second usage sessions.

FIG. 8 illustrates an example of how the lighting control driver 13 controls a supply of electricity from the battery 11 to individual ones of the light emitting diodes 611-1 . . . n of the outer lighting array 61 to generate a predetermined light emission indicative of progression through first and second usage sessions of the aerosol-generating device 10. The second usage session follows the first usage session, using whatever energy remains in the battery 11 after completion of the first usage session. In this example, two distinct portions of the outer lighting array 61 are controlled over the respective first and second usage sessions to generate a light emission which varies according to progress through the respective usage session. As shown in FIG. 8(*a*), the outer lighting array 61 defines two symmetrically arranged curved segments 61-1, 61-2, each segment extending around 180 degrees of the lighting array. Prior to commencement of the first usage session, the lighting control driver 13 controls the supply of energy from the battery 11 to the light emitting diodes 611-1 . . . n of the outer lighting array such that both segments 61-1, 61-2 of the outer lighting array 61 are illuminated over their entire length (see FIG. 8(*a*)). Illumination of the entirety of both segments 61-1, 61-2 provides a light emission indicative of the battery 11 being fully charged and containing sufficient energy to complete two usage sessions. FIGS. 8(*a*) to (*d*) show how, with progression through the first usage session, different ones of the light emitting diodes of the outer lighting array 61 are progressively deactivated with progression through the first usage session to reduce the proportion or "length" of the first segment 61-1 which is illuminated. Arrow 'D1' in FIG. 8(*b*) shows the direction in which different light emitting diodes of the outer lighting array 61 are progressively deactivated over the first usage session to reduce the proportion or length of the first segment 61-1 which is illuminated. The legend in FIG. 8 shows two different static luminance levels for the light emission generated by the light emitting diodes of the outer lighting array 61. These luminance levels are designated as levels 1 and 0. Level 1 represents a maximum luminance level, whereas level 0 represents a deactivated or "off" state in which no light is emitted. On completion of the first usage session, all of the light emitting diodes which contributed to illumination of the first segment 61-1 of the outer lighting array 61 are deactivated, leaving the second segment 61-2 illuminated over its full length. On commencing the second usage session, different ones of the light emitting diodes of the outer lighting array 61 are progressively deactivated with progression through the second usage session to reduce the proportion or length of the second segment 61-2 which is illuminated (see FIGS. 8(*d*) to (*g*)). Arrow 'D2' in FIG. 8(*e*) shows the direction in which different light emitting diodes of the outer lighting array 61 are progressively deactivated over the second usage session to reduce the proportion or length of the second segment 61-2 which is illuminated. Over the entire duration of both the first and second usage sessions to which FIG. 8 relates, the lighting control driver 13 maintains the light emitting diodes of the inner lighting array 62 in the deactivated or "off" state.

Figure 9:
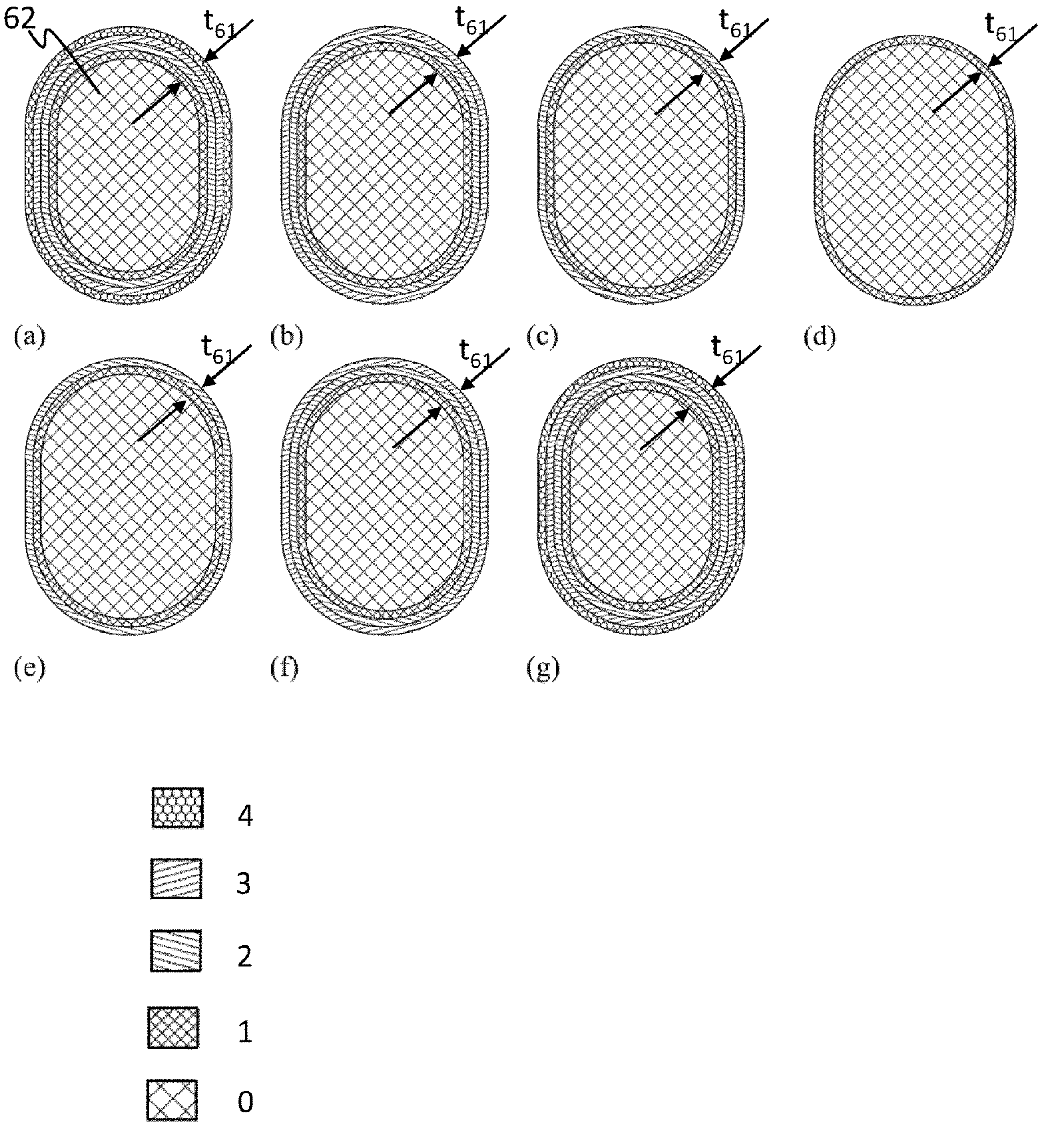
FIG. 9 illustrates an example of how the lighting control driver of the aerosol-generating device of FIGS. 1 to 4 controls a supply of energy to the outer lighting array of the device to generate a predetermined light emission indicative of progression through a pre-heating phase of operation.

FIG. 9 illustrates an example of how the lighting control driver 13 controls a supply of electricity from the battery 11 to individual ones of the light emitting diodes 611-1 . . . n of the outer lighting array 61 to generate a predetermined light emission indicative of progression through a pre-heating phase of operation of the aerosol-generating device 10. The legend in FIG. 9 shows two different luminance levels for the light emission generated by light emitting diodes of the outer lighting array 61. These luminance levels are designated as levels 4, 3, 2, 1 and 0, in order of decreasing luminance. Level 4 represents a maximum luminance level, whereas level 0 represents a deactivated or "off" state in which no light is emitted. At the start of the pre-heating phase, the lighting control driver 13 controls a supply of energy from the battery 11 to the light emitting diodes of the outer lighting array 61 such that the entire thickness of the lighting array 61 is illuminated. FIGS. 9(*a*) to (*d*) show how the light emitting diodes of the outer lighting array 61 are controlled by the lighting control driver 13 to deactivate and reduce the luminance level of different light emitting diodes with progression through a first portion of the pre-heating phase, thereby reducing an illuminated thickness $t_{61}$ and overall luminance of the lighting array 61. FIGS. 9(*d*) to (*g*) show how the lighting control driver 13 then progressively reactivates and increases the luminance level of different light emitting diodes of the outer lighting array 61 through a second portion of the pre-heating phase, thereby increasing the illuminated thickness $t_{61}$ and overall luminance of the lighting array 61. FIGS. 9(*a*) to (*g*) represent a single discrete lighting cycle, with the cycle being repeated whilst the aerosol-generating device 10 remains in the pre-heating phase. In other embodiments, the lighting cycle shown in FIG. 9 may be applied to indicate the aerosol-generating device 10 being in a different state to the pre-heating phase; for example, the lighting cycle of FIG. 9 may be applied to where the device 10 is in a pause mode state or a reactivation state.

Figure 10:
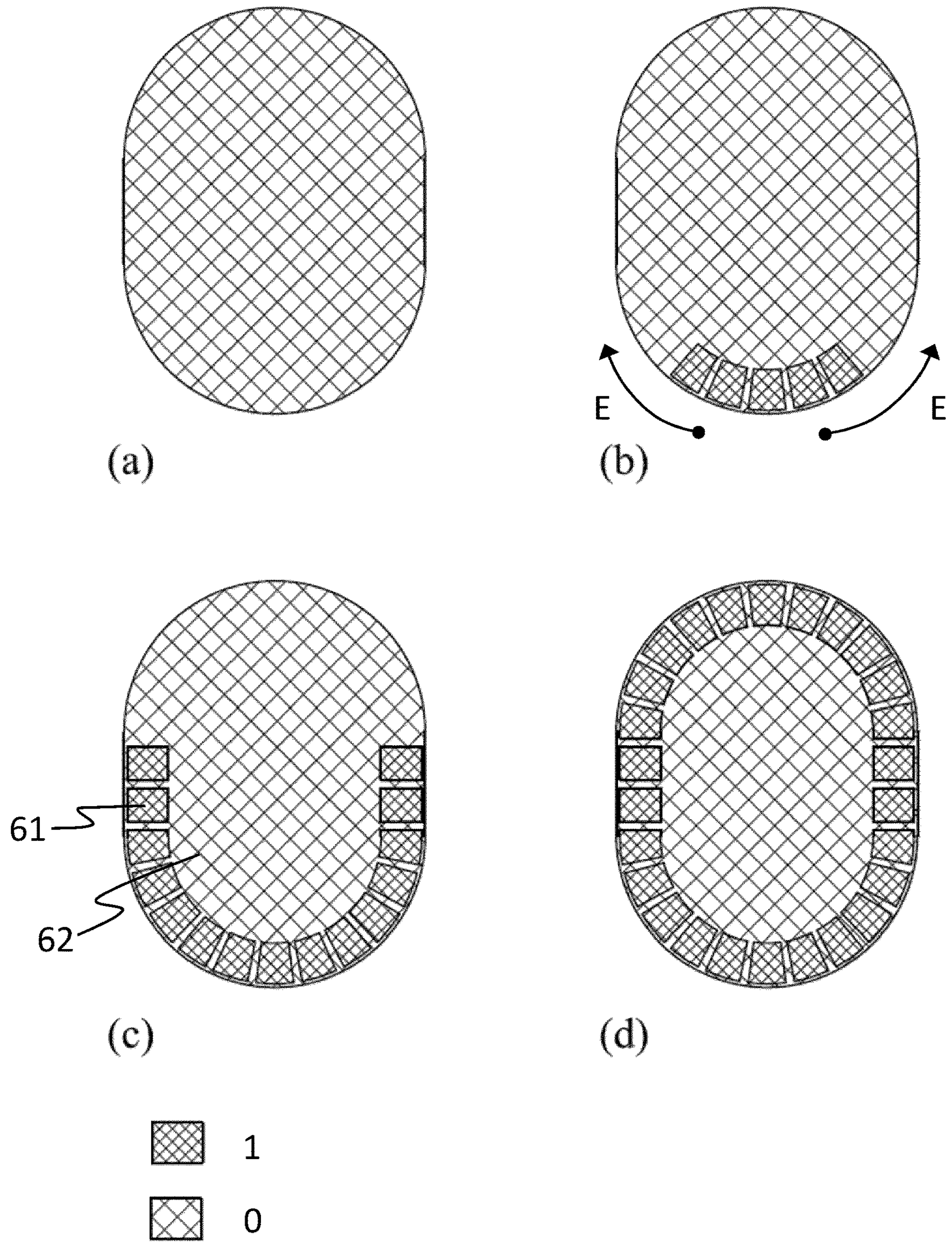
FIG. 10 illustrates an example of how the lighting control driver of the aerosol-generating device of FIGS. 1 to 4 controls a supply of energy to the outer lighting array of the device to generate a predetermined light emission indicative of progression through the pre-heating phase of operation.

FIG. 10 illustrates an example of how the lighting control driver 13 controls a supply of electricity from the battery 11 to individual ones of the light emitting diodes 611-1 . . . n of the outer lighting array 61 to generate a predetermined light emission indicative of progression through the pre-heating phase of operation of the aerosol-generating device 10. The legend in FIG. 10 shows two different combined colour and luminance states for the light emission generated by the light emitting diodes of the outer lighting array 61 with progression through the pre-heating phase of operation. These combined colour and luminance states are designated as states 1 and 0. State 1 represents a state of maximum luminance having a pink colour, whereas state 0 represents a deactivated or "off" state in which no light is emitted. At the start of the pre-heating phase, none of the light emitting diodes of the outer lighting array 61 are activated. FIGS. 10(*a*) to (*d*) show how, with progression through the pre-heating phase, different ones of the light emitting diodes of the outer lighting array 61 are progressively activated to increase a proportion or "length" of the outer lighting array which is activated to generate the pink coloured light associated with state 1. Arrows 'E' in FIG. 10(*b*) show the direction in which different light emitting diodes of the outer lighting array 61 are progressively activated over the pre-heating phase. On completion of the pre-heating phase, all of the light emitting diodes 611-1 . . . n of the outer lighting array 61 are activated to generate the pink coloured light associated with state 1. Over the entire duration of the pre-heating phase to which FIG. 10 relates, the lighting control driver 13 maintains the light emitting diodes 621-1 . . . n of the inner lighting array 62 in the deactivated or "off" state.

Figure 11:
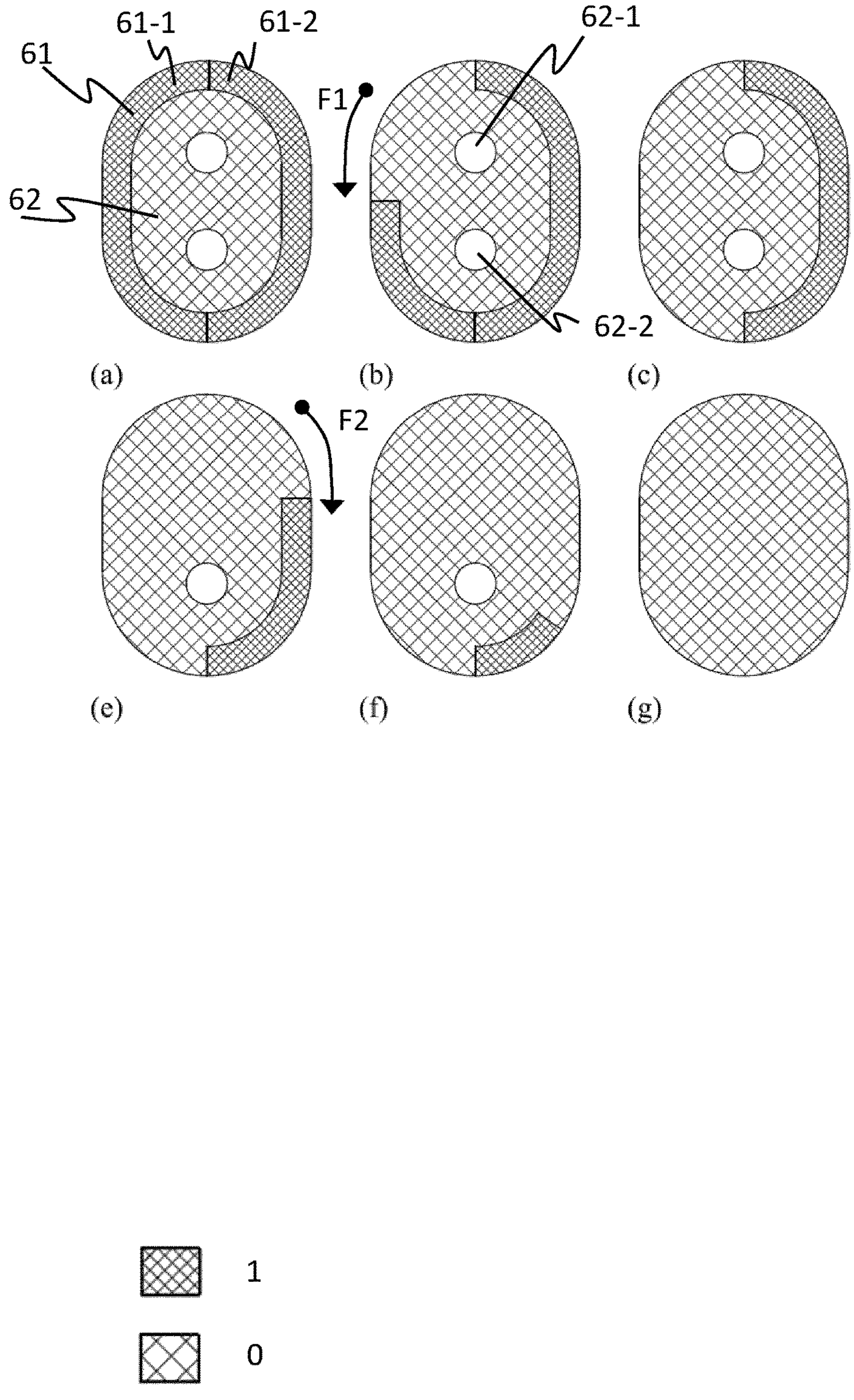
FIG. 11 illustrates an example of how the lighting control driver of the aerosol-generating device of FIG. 1 to 4 controls a supply of energy to the outer lighting array of the device to generate predetermined light emissions indicative of progression through distinct first and second usage sessions, whilst also controlling a supply of energy to the inner lighting array to generate predetermined light emissions indicative of an energy level of a power source of the device.

FIG. 11 illustrates an example which is a variation of the example of FIG. 8. As for FIG. 8, the lighting control driver 13 controls a supply of electricity from the battery 11 to individual ones of the light emitting diodes 611-1 . . . n of the outer lighting array 61 to generate a predetermined light emission indicative of progression through distinct first and second usage sessions of the aerosol-generating device 10. As shown in FIG. 11(*a*), the outer lighting array 61 defines two symmetrically arranged segments 61-1, 61-2, each extending around 180 degrees of the lighting array. Prior to commencement of the first usage session, the lighting control driver 13 controls the supply of energy from the battery 11 to light emitting diodes of the outer lighting array such that both segments 61-1, 61-2 of the outer lighting array 61 are illuminated over their entire length (see FIG. 11(*a*)). FIGS. 11(*a*) to (*d*) show how, with progression through the first usage session, different ones of the light emitting diodes of the outer lighting array 61 are progressively deactivated with progression through the first usage session to reduce the proportion or "length" of the first segment 61-1 which is illuminated. Arrow 'F1' in FIG. 11(*b*) shows the direction in which different light emitting diodes of the outer lighting array 61 are progressively deactivated over the first usage session to reduce the proportion of length of the first segment 61-1 which is illuminated. The legend in FIG. 11 shows two different static luminance levels for the light emission generated by the light emitting diodes of the outer lighting array 61. These luminance levels are designated as levels 1 and 0. Level 1 represents a maximum luminance level, whereas level 0 represents a deactivated or "off" state in which no light is emitted. For the duration of the first usage session, the lighting control driver 13 controls different light emitting diodes of the inner lighting array 62 to illuminate two circular regions 62-1, 62-2 of the lighting array 62. Illumination of both circular regions 62-1, 62-2 is indicative of the battery 11 containing sufficient energy to complete both the first and second usage sessions. On completion of the first usage session, all of the light emitting diodes which contributed to illumination of the first segment 61-1 of the outer lighting array 61 are deactivated. Also on completion of the first usage session, one of the circular regions 62-1 of the inner lighting array 62 is deactivated, leaving circular region 62-2 illuminated; illumination of this single circular region 62-2 of the inner lighting array 62 is indicative of the battery 11 only containing sufficient energy to complete one more usage session, i.e. the second usage session. On commencing the second usage session, different ones of the light emitting diodes of the outer lighting array 61 are progressively deactivated with progression through the second usage session to reduce the proportion or length of the second segment 61-2 which is illuminated (see FIGS. 11(*d*) to (*g*)). Arrow 'F2' in FIG. 11(*e*) shows the direction in which different light emitting diodes of the outer lighting array 61 are progressively deactivated over the second usage session to reduce the proportion or length of the second segment 61-2 which is illuminated. On completion of the second usage session, the second segment 61-2 of the outer lighting array 61 is deactivated to be indicative of the second usage session having been completed. In a similar manner, circular region 62-2 of the inner lighting array 62 is also deactivated on completion of the second usage session, thereby providing a visual indication that the battery 11 requires recharging or replacing in order for further usage sessions to be undertaken.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number "A" is understood as "A"±10% of "A". Within this context, a number "A" may be considered to include numerical values that are within general standard error for the measurement of the property that the number "A" modifies. The number "A", in some instances as used in the appended claims, may deviate by the percentages enumerated above provided that the amount by which "A" deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. An aerosol-generating device for heating an aerosol-forming substrate to generate an inhalable aerosol during a usage session, the aerosol-generating device comprising:
- control electronics, and
- an outer lighting array partially or wholly surrounding an inner lighting array,
- wherein the control electronics are coupled to the outer and inner lighting arrays and are configured to:
  - i) selectively activate one of the outer and inner lighting arrays to generate a first predetermined light emission conveying first data indicative of a state of the aerosol-generating device, and
  - ii) selectively activate the other of the outer and inner lighting arrays to generate a second predetermined light emission conveying second data indicative of a state of the aerosol-generating device,
- wherein the first data and the second data are different from one another.

2. The aerosol-generating article according to claim 1, wherein the first and the second data are indicative of any two of:
- a) a power source of the aerosol-generating device containing sufficient energy to complete a single usage session,
- b) the power source of the aerosol-generating device containing sufficient energy to complete two or more usage sessions,
- c) the power source of the aerosol-generating device containing a level of energy below a predetermined threshold level of energy,
- d) selection or activation of one of a first predetermined thermal profile and a second predetermined thermal profile, wherein each of the first and the second predetermined thermal profiles define a heating profile for heating of the aerosol-forming substrate by an electrical heating arrangement over the usage session, the first and the second predetermined thermal profiles being different from each other,
- e) the aerosol-generating device being in one of a pause mode state or a reactivation state,
- f) selection or activation of a change in operational state of the aerosol-generating device,
- g) progression through the usage session, and
- h) progression through a pre-heating phase in which an electrical heating arrangement is heated to a predetermined target temperature.

3. The aerosol-generating article according to claim 1, wherein the outer lighting array circumscribes at least 50% of a perimeter of the inner lighting array.

4. The aerosol-generating article according to claim 1, wherein the outer lighting array circumscribes all of a perimeter of the inner lighting array.

5. The aerosol-generating article according to claim 1,
- wherein the first data relates to a state of progression of an operational phase of the aerosol-generating device, the second data relates to a different state of the aerosol-generating device, the first predetermined light emission is a predetermined phase progression light emission, and the second predetermined light emission is a predetermined state light emission, and
- wherein the control electronics are further configured to:
  - i) selectively activate one of the outer and the inner lighting arrays to generate the predetermined phase progression light emission indicative of and in response to progression of the operational phase of the aerosol-generating device, and
  - ii) selectively activate the other of the outer and the inner lighting arrays to generate the predetermined state light emission indicative of and in response to the different state of the aerosol-generating device.

6. The aerosol-generating article according to claim 5, wherein the operational phase is the usage session.

7. The aerosol-generating article according to claim 5, wherein the control electronics are further configured to:
- i) selectively activate the outer lighting array to generate the predetermined phase progression light emission, and
- ii) selectively activate the inner lighting array to generate the predetermined state light emission.

8. The aerosol-generating article according to claim 5, wherein the control electronics are further configured to progressively reduce an activated area or an activated length of one of the outer lighting array and the inner lighting array with progression through the operational phase of the aerosol-generating device to generate the predetermined phase progression light emission.

9. The aerosol-generating article according to claim 5, wherein the control electronics are further configured to progressively increase an activated area or an activated length of one of the outer lighting array and the inner lighting array with progression through the operational phase of the aerosol-generating device to generate the predetermined phase progression light emission.

10. The aerosol-generating article according to claim 1, wherein one or each of the outer lighting array and the inner lighting array is an arcuate segment extending around an arc of at least 180 degrees.

11. The aerosol-generating article according to claim 10, wherein the arcuate segment extends around an arc of 360 degrees to define a closed annulus.

12. The aerosol-generating article according to claim 10, wherein the control electronics are further configured to progressively reduce an activated length of the arcuate segment with progression through the operational phase of the aerosol-generating device to generate the predetermined phase progression light emission.

13. The aerosol-generating article according to claim 10, wherein the control electronics are further configured to progressively increase an activated length of the arcuate segment with progression through the operational phase of the aerosol-generating device to generate the predetermined phase progression light emission.

14. The aerosol-generating article according to claim 1,
- wherein a predetermined area of the inner lighting array defines a predetermined shape, and
- wherein the control electronics are further configured to activate the predetermined area defining the predetermined shape to generate either of the first predetermined light emission or the second predetermined light emission.

15. The aerosol-generating article according to claim 1, further comprising a touch-activated interface coupled to the control electronics and comprising an activation area contactable by a user's digit so as to provide a user input to the control electronics.

16. The aerosol-generating article according to claim 15, wherein the touch-activated interface forms part of a display window of either or both of the outer lighting array and the inner lighting array.

17. The aerosol-generating article according to claim 15, wherein the touch-activated interface further comprises a capacitive panel.

* * * * *